US011128594B2

(12) United States Patent
Cue et al.

(10) Patent No.: US 11,128,594 B2
(45) Date of Patent: *Sep. 21, 2021

(54) MANAGING DRAFTS OF ELECTRONIC DOCUMENTS ACROSS CLIENT DEVICES

(71) Applicant: Dropbox, Inc., San Francisco, CA (US)

(72) Inventors: Adam Cue, San Francisco, CA (US); Tim Van Damme, San Francisco, CA (US); George Milton Underwood, IV, Palo Alto, CA (US); Sean Beausoleil, Mountain View, CA (US); Belinda Preno, San Francisco, CA (US); Steven Kabbes, Mountain View, CA (US); David Barshow, Menlo Park, CA (US); Anthony DeVincenzi, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,386

(22) Filed: Mar. 18, 2020

(65) Prior Publication Data

US 2020/0220834 A1    Jul. 9, 2020

Related U.S. Application Data

(63) Continuation of application No. 15/358,053, filed on Nov. 21, 2016, now Pat. No. 10,623,367, which is a
(Continued)

(51) Int. Cl.
*H04L 12/58* (2006.01)
*H04L 29/08* (2006.01)
(Continued)

(52) U.S. Cl.
CPC ............ *H04L 51/34* (2013.01); *G06F 16/273* (2019.01); *G06Q 10/10* (2013.01); *G06Q 10/107* (2013.01);
(Continued)

(58) Field of Classification Search
CPC ....... H04L 51/34; H04L 51/00; H04L 51/046; H04L 51/22; H04L 69/329; G06F 16/273; G06Q 10/10; G06Q 10/107
(Continued)

(56) References Cited

U.S. PATENT DOCUMENTS 6,067,551 A * 5/2000 Brown .................. G06Q 10/10
6,405,225 B1   6/2002 Apfel et al.
(Continued)

FOREIGN PATENT DOCUMENTS

WO        0135211 A2    5/2001

OTHER PUBLICATIONS

About.com, "Microsoft Word—Working with Versions of Your Documents," Wayback Machine date of Apr. 1, 2013, retrieved from the internet http://web.archive.org/web20130101045753/ and http://wordprocessing.about.com/library/WordTutorials/blversions2.htm, Original URL: http://wordprocessing.about.com/library/WordTutorials/blversions2.htm on Apr. 3, 2015, 2 pages.
(Continued)

*Primary Examiner* — James E Springer
*Assistant Examiner* — Patrick F Ngankam
(74) *Attorney, Agent, or Firm* — DLA Piper LLP (US)

(57) ABSTRACT

Techniques are described for managing, drafts of an electronic document (e.g., an electronic note, an electronic message, an electronic calendar invitation, and/or other types of electronic documents) between client devices. Such an electronic document can be composed using different clients, such that composing the document can be continued using different clients. A draft of an electronic document can be stored by clients and/or the message management service as a metadata. A message management service can be implemented as an intermediary computing system to manage a current version of a draft in local storage when a draft
(Continued)

is composed using a client device. The message management service can manage version information of a draft that is exists, if any, on each of the client devices. The message management service can synchronize a draft of the message with client devices when a draft is composed using a client device.

19 Claims, 16 Drawing Sheets

Related U.S. Application Data continuation of application No. 14/552,166, filed on Nov. 24, 2014, now Pat. No. 9,503,402.

(60) Provisional application No. 62/038,746, filed on Aug. 18, 2014.

(51) Int. Cl.
    *G06Q 10/10*     (2012.01)
    *G06F 16/27*     (2019.01)
    *H04W 4/12*     (2009.01)

(52) U.S. Cl.
    CPC ........ *H04L 29/08072* (2013.01); *H04L 51/00* (2013.01); *H04L 51/046* (2013.01); *H04L 51/22* (2013.01); *H04L 67/1095* (2013.01); *H04L 69/329* (2013.01); *H04W 4/12* (2013.01)

(58) Field of Classification Search
    USPC .......................................................... 709/206
    See application file for complete search history.

(56) References Cited

U.S. PATENT DOCUMENTS

| | | | |
|---|---|---|---|
| 6,507,865 B1 | 1/2003 | Hanson et al. | |
| 7,325,196 B1 | 1/2008 | Covington et al. | |
| 7,325,197 B1 | 1/2008 | Massena et al. | |
| 7,380,202 B1 | 5/2008 | Lindhorst et al. | |
| 7,437,421 B2 | 10/2008 | Bhogal et al. | |
| 7,529,780 B1 | 5/2009 | Braginsky et al. | |
| 7,593,943 B2 | 9/2009 | Clarke et al. | |
| 7,778,926 B1 | 8/2010 | Grinchenko et al. | |
| 7,865,545 B1 | 1/2011 | Estrada et al. | |
| 7,870,204 B2 | 1/2011 | Levasseur et al. | |
| 8,140,436 B2 | 3/2012 | Grinchenko et al. | |
| 8,196,029 B1 | 6/2012 | Rucker et al. | |
| 8,352,870 B2 | 1/2013 | Bailor et al. | |
| 8,370,298 B2 | 2/2013 | Strong et al. | |
| 8,453,052 B1 | 5/2013 | Newman et al. | |
| 8,566,399 B2 | 10/2013 | Ferguson et al. | |
| 8,606,855 B2 | 12/2013 | Bhogal et al. | |
| 8,825,758 B2 | 9/2014 | Bailor et al. | |
| 2002/0099777 A1 | 7/2002 | Gupta et al. | |
| 2004/0172450 A1 | 9/2004 | Edelstein et al. | |
| 2005/0033811 A1* | 2/2005 | Bhogal | G06Q 40/00 709/206 |
| 2005/0160145 A1 | 7/2005 | Gruen et al. | |
| 2005/0193067 A1* | 9/2005 | Ferguson | H04L 51/14 709/206 |
| 2006/0136513 A1 | 6/2006 | Ngo et al. | |
| 2006/0242204 A1 | 10/2006 | Karas et al. | |
| 2007/0016647 A1 | 1/2007 | Gupta et al. | |
| 2009/0216843 A1 | 8/2009 | Willner et al. | |
| 2011/0313972 A1 | 12/2011 | Albouze et al. | |
| 2012/0185434 A1 | 7/2012 | Giampaolo et al. | |
| 2013/0262373 A1 | 10/2013 | Rampson et al. | |
| 2014/0108498 A1 | 4/2014 | Berkebile et al. | |
| 2014/0337278 A1 | 11/2014 | Barton et al. | |
| 2016/0050177 A1 | 2/2016 | Cue et al. | |

OTHER PUBLICATIONS

Citro S., et al., "Conflict Management for Real-Time Collaborative Editing in Mobile Replicated Architectures," Available at ACM, 2007, pp. 115-124.
Final Office Action from U.S. Appl. No. 15/358,053, dated Sep. 19, 2019, 22 pages.
Goodwill Community Foundation, "Google Drive and Docs-Sharing and Collaborating," Wayback Machine, Available at: http://web.archive.org/web/20130523073816/http://www.gcflearnfree.org/googledriveanddocs/6/print, Original URL: http://www.gcflearnfree.org/googledriveanddocs/6/print, May 2013, 15 pages.
Google Groups, "How to view earlier version of current draft," 2012, available at: http://productforum.google.com/forum/#topic/gmail/WLstppUlc, 1 page.
"IMAP Synchronization Thunderbird Help," Mozilla Support, Jul. 29, 2014, retrieved from the internet URL: http://support.mozilla.org/en-US/kb/imap-synchronization, 4 pages.
Kelly S., "How does track changes in Microsoft Word Work," 2004, retrieved from http://shaunakelly.com/word/sharing/howtrackchangesworks.html on Apr. 3, 2015, 10 pages.
Notice of Allowance for U.S. Appl. No. 15/358,053 dated Feb. 6, 2020, 10 pages.
Office Action for U.S. Appl. No. 14/552,166 dated Apr. 9, 2015, 11 pages.
Office Action for U.S. Appl. No. 14/552,166 dated Oct. 20, 2015, 18 pages.

* cited by examiner

MANAGING DRAFTS OF ELECTRONIC DOCUMENTS ACROSS CLIENT DEVICES

CROSS-REFERENCE TO RELATED APPLICATIONS

This is a continuation of U.S. application Ser. No. 15/358,053, filed Nov. 21, 2016, which is a continuation of U.S. application Ser. No. 14/552,166, filed Nov. 24, 2014, now U.S. Pat. No. 9,503,402, issued Nov. 22, 2016, which claims priority to U.S. Provisional Application Ser. No. 62/038,746, filed Aug. 18, 2014, the entirety of each of which is incorporated herein by reference.

BACKGROUND

The present disclosure relates generally to electronic message management systems and services and in particular to managing drafts of electronic documents across client devices.

In recent years, electronic messaging services have increased in popularity. Email, for example, has become a vital tool for communication. Users can regularly manage their email across many different devices during a given day. While drafting an email, a user can be interrupted and as a result, may wish to continue updating the draft later possibly using a different device. In some cases, a draft may be modified several times using different devices throughout the day. As a draft is revised, a different version of a draft may reside on each device used to revise a draft. The draft of a message may be tied to a messaging account (e.g., an email account) and may be managed in association with other related messages. However, due to issues such as those involving connectivity, a device that has the current draft may be unable to synchronize that draft with an email message service. Later when the device regains connectivity, synchronization with a messaging service can occur such that the current draft stored on the device may inadvertently be replaced by a previously revised draft from a different device, causing a user to lose his current draft. Client devices and email message services may be conflicted and lacking sophistication to detect and handle such conflicts. Better techniques for managing drafts of electronic documents, such as a message, are therefore desirable.

SUMMARY

The present disclosure relates to techniques for managing drafts of an electronic document between client devices. An electronic document can include an electronic note, an electronic message, an electronic calendar invitation, other types of electronic documents, or combinations thereof. A person may wish to draft an electronic document using multiple client devices. In doing so, a draft may be modified several times such that a different draft of the electronic document may reside on each client device that is used. However, a draft composed on one client device may not be accessible to or editable by a different client device. Further, use of different client devices can lead to multiple versions of a draft, which can lead to management difficulties across the various client devices. A message management service can be implemented as an intermediary computing system to manage a current version of a draft composed using different client devices. The message management service can synchronize updates to a draft across different client devices to enable a user to seamlessly compose a draft and make revisions from different client devices across different platforms.

In some embodiments, a message management service can manage a current version of a draft in local storage for a draft of an electronic document composed using one or more client devices. In some embodiments, a draft of an electronic document (e.g., an electronic message) can be stored as metadata by a client device and/or a message management service. For example, the content of a draft (e.g., a body of a draft) can be stored as metadata on the client device. A draft of an electronic document can be stored by an online content management service. Storage of drafts by a message management service or an online content management service can reduce usage of storage quotas associated with an account provided by a service, such as a messaging service. In some embodiments, a draft of a document can be stored in association with an account provided by either of the message management service or the online content management service such that the draft can be accessed using any client that can communicate with the service. A message management service can manage version information of a draft composed using different client devices. In some embodiments, a client device and/or message management service can implement techniques or algorithms, such as vector clocks, to manage version information about a version of a draft composed using multiple client devices.

In some embodiments, the message management service can send a composed draft to client devices so that the client devices have a current version of the composed draft. The draft can be provided to a client device with version information of the draft stored by each of the client devices. A client device can use the version information to determine a current version of a draft to present to a user. The client device can present a current version of a composed draft that can be further composed using any of the client devices. A client device can update the version information of the draft composed using the client device. The updated draft can be sent to the message management service including the version information of the draft stored by other client devices. The message management service can distribute an updated draft and version information of the updated draft to other client devices to inform them of the composed draft.

In some embodiments, a message management service and/or the client device(s) can detect a conflict between a draft composed using multiple client devices. For example, a conflict can be determined between a draft stored by a message management service and an updated version of the draft composed using a client device. The version information stored in association with a draft can be used to determine whether a conflict exists between a draft stored by one client device and a draft composed using another client device. In some embodiments, the message management service and/or a client device can resolve a conflict between two drafts by choosing one of the conflicting drafts, discarding a draft that is causing the conflict, or replacing a draft with one of the conflicting drafts. In some embodiments, a client device can prompt a user with options to choose a draft or a manner in which to resolve or respond to a conflict.

In some embodiments, a user can operate a client device to perform one or more actions with respect to a draft of an electronic document. For example, a client device can present a user with one or more interfaces to send a draft of an electronic document as a message. The draft can be sent as an electronic message from an account (e.g., an email account associated corresponding to an email address) or from an account provided by the message management service. In another example, a user can request via the client device a draft of an electronic document to be stored as a particular type of electronic document, e.g., a note.

Certain embodiments of the present invention can be implemented by a computing system of a message management service. The computing system can include a memory and a processor coupled to the memory. The processor can be configured to perform a method. The method can include receiving, from a first device, first data and a first draft of a message composed using the first device. The first data can include version information corresponding to the first device. The version information can indicate a version associated with the first draft of the message. The method can include storing second data based on the first data. The method can include storing a second draft based on the first draft. The method can include sending, to a second device, the second data and the second draft. The method can include receiving, from the second device, third data and a third draft of the message composed using the second device. The third draft can be composed by modifying the second draft. The third data can be based on updating the second data to indicate a version associated with the third draft. The method can include updating the second data based on the third data. The method can include updating the second draft based on the third draft.

Certain embodiments of the present invention can be implemented by a computing system. The computing system can be implemented by a message management service. The computing system can include one or more processors and a memory accessible to the one or more processors. The memory can include instructions that are executable by the one or more processors to perform one or more operations. In some embodiments, the operations can be implemented by a method. A method can include receiving, from a first device, first data and a first draft of a message (e.g., an email message) composed using the first device. In some embodiments, a draft of a message can be an electronic document. The first data can include version information corresponding to the first device. In some embodiments, a draft of a message can include a body of the message, and information indicating a recipient of the message. The version information can indicate a version associated with the first draft of the message. The method can further include storing a second draft of the message based on the first draft. In some embodiments, a draft may not be stored in association with information identifying a messaging account. The method can further include storing second data based on the first data. The second data can indicate a version associated with the second draft. The method can further include sending, to a second device, the second data and the second draft. The method can further include receiving, from the second device, third data and a third draft of the message, the third draft composed by modifying the second draft using the second device. The third data can be based on an update to the second data to indicate a version associated with the third draft. The method can further include updating the second data based on the third data. The method can further include updating the stored second draft based on the third draft. In some embodiments, the first data, the second data, and the third data can each be stored using a data structure that includes version information indicating a version associated with a draft of a message for each device of the plurality devices. The version of the draft of the message for a device can correspond to a value, the value being adjusted based on composing the draft of the message.

In some embodiments, the method can further include receiving, from the first device, a request to send the message, where the request identifies a sender of the message. In some embodiments, the method can further include identifying a messaging account associated with the sender of the message and sending the second draft of the message stored by the computer system. The second draft can be sent, from the identified messaging account, to an electronic address associated with a recipient of the message.

In some embodiments, the method can further include sending the second draft of the message to a content management service for storage.

In some embodiments, the method can further include comparing the second data to the third data to determine whether the version of the second draft is different from the version of the third draft. The method can further include replacing the stored second draft with the third draft upon determining that the version of the second draft is different from the version of the third draft. Updating the second data can include replacing the second data with the third data upon determining that the version of the second draft is different from the version of the third draft.

In some embodiments, the method can further include comparing the second data to the third data to determine whether the version of the second draft is different from the version of the third draft. The method can further include discarding the third draft upon determining that the version of the second draft is not different from the version of the third draft. Updating the second data can include discarding the third data when the version of the second draft is not different from the version of the third draft.

In some embodiments, the method can further include comparing the second data to the third data to determine whether the version of the second draft is different from the version of the third draft. The method can further include, upon determining that the version of the second draft is different from the version of the third draft, sending, to the second device, a message indicating a conflict between the stored second draft and the second draft sent to the second device. The message indicating the conflict can include the stored second draft. The message can cause the second device to prompt a user to choose one of the stored second draft or the third draft.

In some embodiments, the method can further include receiving, from the first device, a request to send the message. The request can identify a sender of the message. The method can further include identifying a messaging account associated with the sender of the message. The method can further include sending the second draft of the message. The second draft can be sent, from the identified messaging account, to an electronic address associated with a recipient of the message.

Certain embodiments of the present invention can be implemented by a computing system. The computing system can be implemented by a message management service. The computing system can include one or more processors and a memory accessible to the one or more processors. The memory can include instructions that are executable by the one or more processors to perform one or more operations. In some embodiments, the operations can be implemented by the method. A method can include receiving from a first device, first data and a first draft of a message composed using the first device. The first data can include version information corresponding to the first device, the version information indicating a version associated with the first draft of the message. The method can further include storing a second draft of the message based on the first draft. The method can further include storing second data based on the first data. The second data can indicate a version associated with the second draft. The method can further include sending, to a second device, the second data and the second draft. The method can further include receiving, from the first device, updated first data and an updated first draft. The updated first data can indicate an update to the version information in the first data. The method can further include updating the second data based on the updated first data. The method can further include updating the stored second draft based on the updated first draft. The method can further include receiving, from the second device, third data and a third draft of the message. The third draft can be composed by modifying the second draft at the second device. The third data can indicate a version associated with the third draft. The method can further include detecting a conflict based on comparing the updated second data to the third data.

In some embodiments, the method can further include performing an operation based on the detected conflict, where the operation includes sending a message to the second device, the message causing the second device to prompt a user to choose between the stored second draft and the third draft.

In some embodiments, the method can further include performing an operation based on detected conflict, where the operation includes storing both the updated second draft and the third draft.

The following detailed description together with the accompanying drawings will provide a better understanding of the nature and advantages of the present invention.

DETAILED DESCRIPTION

Figure 1:
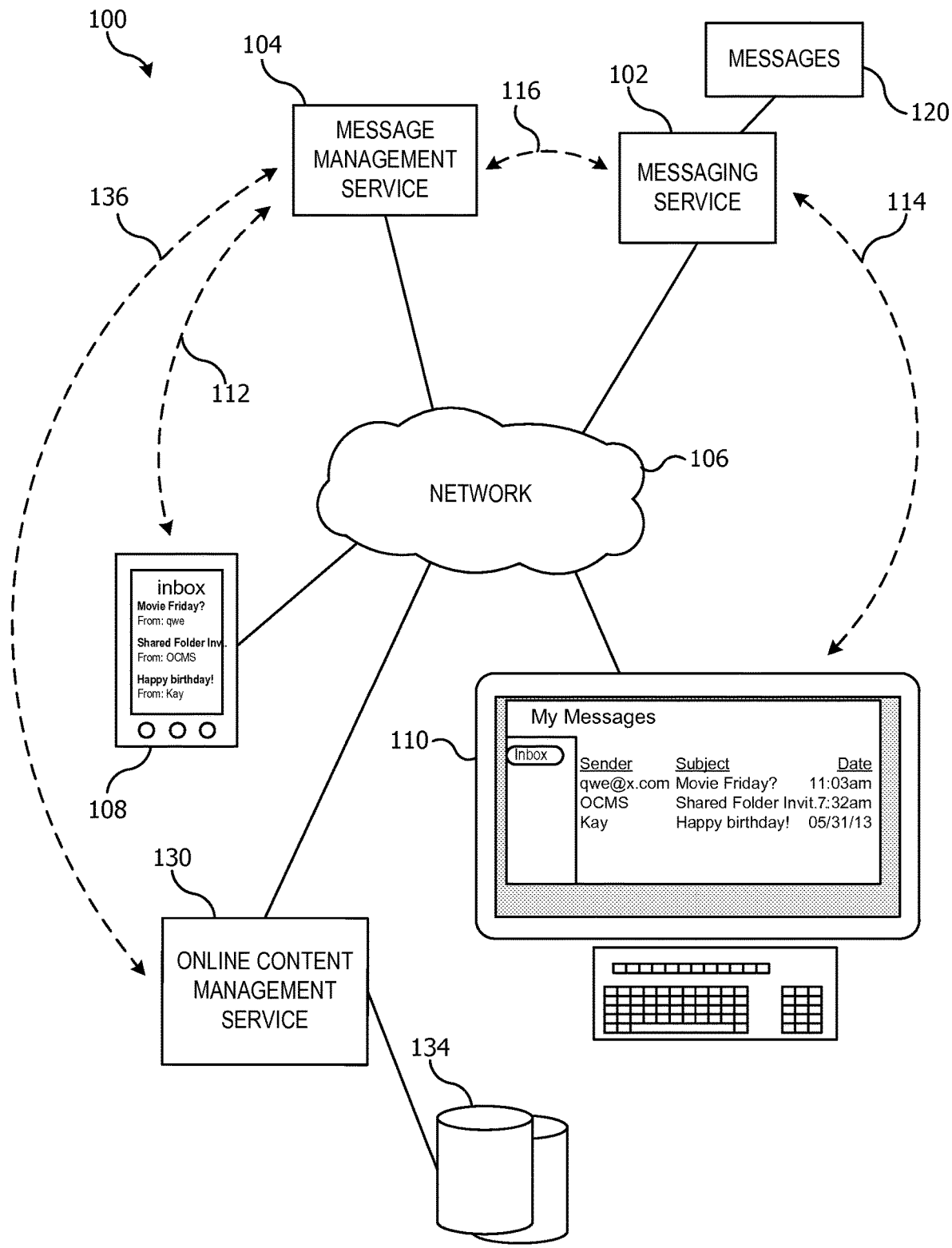
FIG. 1 shows a block diagram of a communication system according to an embodiment of the present invention.

The present disclosure relates to techniques for managing drafts of an electronic document between client devices. An electronic document can include an electronic note, an electronic message, an electronic calendar invitation, other types of electronic documents, or combinations thereof. A message management service can be implemented as an intermediary computing system to manage a current version of a draft in local storage for a draft of an electronic document composed using one or more client devices. Composing a draft can include actions such as creating a draft, updating a draft, modifying a draft, deleting a draft, copying a draft, other actions involving manipulation of a draft, or combinations thereof. The message management service can send a composed draft to client devices so that the client devices have a current version of the composed draft. The client devices can present a current version of a composed draft that can be further composed using any of the client devices.

In some embodiments, a draft of an electronic document (e.g., an electronic message) can be stored as metadata by a client device and/or a message management service. For example, the content of a draft (e.g., a body of a draft) can be stored as metadata on the client device. In some embodiments, a client device and/or message management service can implement techniques or algorithms, such as vector clocks, to manage information about a version of a draft composed using multiple client devices. A message management service can manage version information of a draft composed using different client devices. The draft can be stored in association with version information indicating a version of the draft stored by each client device that has the draft. The draft can be provided to a client device with version information of the draft stored by each of the client devices. A client device can use the version information to determine a current version of a draft to present to a user.

In some embodiments, when a draft is composed using a client device, the version information of the draft stored by the client device can be updated. The updated draft can be sent to the message management service including the version information of the draft stored by other client devices. The message management service can store the composed draft and the version information. The composed draft and the version information can be distributed to other client devices to inform them of the composed draft.

In some embodiments, a message management service and/or the client device(s) can detect a conflict between a draft composed using multiple client devices. For example, a conflict can be determined between a draft stored by a message management service and an updated version of the draft composed using a client device. The version information stored in association with a draft can be used to determine whether a conflict exists between a draft stored by one client device and a draft composed using another client device. In some embodiments, the message management service and/or a client device can resolve a conflict between two drafts by choosing one of the conflicting drafts, discarding a draft that is causing the conflict, or replacing a draft with one of the conflicting drafts. In some embodiments, a client device can prompt a user with options to choose a draft or a manner in which to resolve or respond to a conflict.

In some embodiments, a user can operate a client device to perform one or more actions with respect to a draft of an electronic document. For example, a client device can present a user with one or more interfaces to send a draft of an electronic document as a message. The draft can be sent as an electronic message from an account (e.g., an email account associated corresponding to an email address) or from an account provided by the message management service. In another example, a user can request via the client device a draft of an electronic document to be stored as a particular type of electronic document, e.g., a note.

FIG. 1 shows a block diagram of communication system 100 according to an embodiment of the present invention. Communication system 100 can include messaging service 102, message management service 104, and online content management service 130 connected to network 106. Also connected to network 106 can be various clients 108, 110 that can be used to access messaging service 102, an online content management service 130, and/or message management service 104. In this example, client 108 accesses message management service 104 (as indicated by dashed arrow 112) while client 110 accesses messaging service 102 (as indicated by dashed arrow 114).

Online content management service 130 can include, for example, a file storage service, a file sharing service, a social media service that allows users to post messages and/or other content, and so on. Online content management service 130 can communicate with one or more data stores 134. Online content management service 130 can be hosted on servers maintained by a service provider and accessed via a network 106, such as the Internet. In some embodiments, online content management service 130 can store content in one or more data sources (e.g., a database). The content can include audio, video, data, images, files, email messages, a draft of an electronic document (e.g., a draft of a message), and the like. In some embodiments, online content management service 130 can access message management service 104, or vice versa (as indicated by dashed arrow 136).

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo!® Mail (a service of Yahoo! Inc.). Other examples can include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.). In some embodiments, a user can establish an account with messaging service 102, and messaging service 102 can store and provide access to user's messages 120. Messaging service 102 can also provide web-based client interfaces, dedicated application programs, application program interfaces (APIs), and/or other tools for facilitating user access to messages 120.

Message management service 104 can be a service that acts as a proxy or intermediary between messaging service 102 and a client 108, as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

In some embodiments, enhanced functionality provided by message management service 104 can include managing drafts of an electronic document between devices, e.g., client 108 and client 110. An electronic document can include an electronic note, an electronic message, an electronic calendar invitation, other types of electronic documents, or combinations thereof. A draft of an electronic document can be composed using different clients. For example, a user can begin composing a draft of an electronic document using one client, and then can resume composing the draft of the electronic document using the same client or a different client. Each time a draft is modified, the new version of the draft can be received and stored by message management service 104 and subsequently distributed to other connected clients connected to message management service 104. The draft may be distributed to the clients associated with an account of a user provided by message management service 104. As such, a user can view and/or compose a new draft or an existing draft on any of the clients associated with the account of the user. In one instance, a user can resume composing the draft with a first client initially used to compose the draft or with another client associated with an account of the user that has received a version of the draft initially composed using the first client. A local copy of a previous draft of the electronic message can be updated by the client device when the new version of the draft is received from message management service 104. Composing a draft can include, without restriction, actions such as creating a draft, updating a draft, modifying a draft, deleting a draft, copying a draft, other actions involving manipulation or modification of information corresponding to a draft, or combinations thereof. For purposes of illustration, some embodiments are described herein to illustrate techniques for management of drafts of messages between clients. However, such embodiments are not limited to draft of electronic messages and can be implemented for managing drafts of any type of electronic document, such as electronic documents described herein.

Message management service 104 can store a draft of an electronic document received from a client. Message management service 104 can store a current version of a draft composed using a client and can manage information indicating the current version of the draft. A current version of a draft can be pushed to other clients that can communicate with message management service 104. Clients can update their version of the draft of an electronic document based on the current version of a draft received from message management service 104. The "current version" of a draft can refer to the most recently updated and synchronized version of the draft received from message management service 104.

In some embodiments, a draft (e.g., a current version of a draft) of an electronic document can be stored in association with an account of a user. For example, a draft can be stored such that is linked to an account. Access to compose the draft can be permitted on any client via access through the account. A draft can be stored in association with an account provided by messaging service 102, message management service 104, online content management service 130, or combinations thereof. In some embodiments, message management service 104 and/or a client can store a draft of an electronic document in memory or storage allocated for an account. In some embodiments, message management service 104 and/or a client can store a draft of an electronic document in storage that is separate (e.g., physical separate in different storage devices or logically separated in memory) from storage for messages, e.g., messages that are sent or that have been received. In some embodiments, a draft of an electronic document can be stored such that it is not associated with an account (e.g., an email account) and/or other information (e.g., messages) stored in association with the account. A draft of an electronic document can be stored without association with a particular message or relationship to other electronic documents related to the electronic document.

In some embodiments, message management service 104 can store a draft locally rather than at messaging service 102 in association with an account managed by messaging service 102 or message management service 104, or at online content management service 130 in association with an account managed by online content management service 130. In such embodiments, storage used for the draft of the message may not be counted towards a limit, threshold, or quota of storage allocated for an account managed by messaging service 104. In some embodiments, a draft can be stored in association with an account managed by message management service 104 or online content management service 130. In such embodiments, storage of a draft of a message may not be considered for used of storage for an account managed by message management service 104 or online content management service 130.

In one illustrative example, a user can operate a client (e.g., client 108) to compose a draft of a message. The client, when in communication with message management service 104, can send a draft of a message to message management service 104. A draft provided by a client can include version information indicating a version of the draft stored on the client. Message management service 104 can associate a draft of a message with version information of the draft stored by the client. In some embodiments, the draft can be stored in association with an account or other information associated with a user operating the client. In some embodiments, an account can be associated with a client, such that the draft can be stored in association with the account based on the client used to compose the draft.

Message management service 104 can communicate with multiple clients to synchronize the draft stored on those clients. Message management service 104 can send a current draft along with associated version information to other clients. A client and/or message management service 104 can implement techniques or algorithms, such as vector clocks, to track revisions of a draft based on partial ordering of events. For example, message management service 104 can maintain data in a data structure (e.g., a vector) that stores version information for each client. The version information for a client can include a value corresponding to a version of a draft stored by that client. Initially, the value can be a default value (e.g., a value of 0) when no draft of an electronic document is stored on the client. When a draft is received by a client, the client can store the draft and adjust (e.g., increment) the value to reflect a new version corresponding to the stored draft. Each time a client composes a draft, a value corresponding to a version of the draft of the electronic document on the client can be adjusted (e.g., incremented) in the data structure to reflect the composed version. The version of the draft can be provided to message management service 104 along with the composed version of the draft of the electronic document.

Message management service 104 can determine a current version of a draft based on drafts received from clients. For example, message management service 104 can determine whether a draft of an electronic document received from a client is composed based on a current version of a draft, which may have been composed using that client and/or other clients. Message management service 104 can determine a current version of a draft based on the version information of the draft corresponding to the different clients. Each revision to a draft (e.g., modification or deletion of the draft) can be identified based on the version information, which indicates a value corresponding to the version of the revised draft stored at a client. The version of the draft corresponding to each client can enable message management service 104 to determine whether a client has been provided a current version of the draft and if not, send the current version of the draft to that client. When a draft is received from a client, message management service 104 can determine whether the draft is based on a current version of the draft among several clients. In some embodiments, message management service 104 can send a current version of the draft to client devices to ensure that the clients can present a user with a current version for further composition. While one technique is described herein, a person of ordinary skill in the art can appreciate that any number or combination of techniques can be implemented to manage synchronization of drafts between clients.

Message management service 104 can synchronize a draft with one or more clients that are associated with an account of a user. A client can use the version information to determine whether to update a local copy of the draft with the copy received from message management service. A client can use the version information to determine whether the draft received from message management service 104 is different from a draft stored by the client. The client can accordingly determine how to resolve the conflict or present a user with an option to address the conflict.

In some embodiments, message management service 104 can receive updates to a draft from different clients, sometimes in an order that is different from an order in which the updates where made to the draft. As a result, updates to a draft of a message can be received at different times from different clients based on each client's ability to communicate with message management service 104 when the draft has been updated. Message management service 104 can identify conflicts between different versions of a draft of an electronic document composed on clients at different times. For example, message management service 104 can use the version information about the newer version of the draft that message management service 104 has stored to determine whether other clients have been updated. Upon detecting a conflict, message management service 104 can handle a conflict in many ways, such as prompting a user (e.g., present an interface requesting a response from the user) of the client to choose a draft, or message management service 104 can choose a draft as the current draft.

In some embodiments, message management service 104 can receive a request from a client to send a version of a composed draft as a message to one or more recipients. Along with a request, message management service 104 can receive information indicating a sender of the message, a recipient of the message, other information to send the message, or combinations thereof. In some embodiments, the received information can indicate account information associated with a sender. Message management service 104 can send a draft of a message on behalf of any number of senders and/or to any number of recipients. Message management service 104 can determine account information associated with each sender and send the draft of a message using the account(s) identified based on the account information. Alternatively or additionally, message management service 104 can store a draft of a message as an electronic document, which can be accessed again using a client or an application that can communicate with message management service 104. For example, a draft of a message can be stored in association with an account provided by messaging service 104 so that the draft can be accessed by an application used through messaging service 104. In some embodiments, a draft of a message can be stored by online content management service 130, which can enable a user to access the draft as a document via an application on a client on which the draft was created or a different client.

Clients 108 and 110 can be user-operated computing devices that can execute software to interact with online content management service 130, message management service 104, and/or messaging service 102. Various types of computing devices can be used, including desktop computers, laptop computers, tablet computers, smart phones, wearable computing devices, personal digital assistants, and so on. By way of example, client 108 can be a smart phone that can execute an application program (also referred to as an app) to communicate with message management service 104 via network 106. The app can be provided by a provider of message management service 104 and can be customized to allow access to enhanced message management functions such as managing a draft of an electronic document. For example, an interface of client 108 can be configured to allow the user to manage and/or compose (e.g., create, read, modify, update, or delete) a draft of an electronic document as described herein. A user can operate another client 110 to continue composing a draft if the draft was previously composed using a different device, e.g., client 108. Composing a draft of an electronic document can include creating, modifying, or deleting all or part of the draft. When a client receives a request from a user to perform one or more actions to manage a draft, client 108 can process the request to perform the action(s). An action can include determining a requested operation to manage drafts of a document as described herein. Client 108 can display one or more user interfaces that can enable a user to perform an action to manage a draft. Client 108 can further determine one or more operations to perform based on a requested action to manage a draft. Based on the request, client 108 can communicate appropriate instructions (e.g., including a draft and version data of the draft as described below) to message management service 104 and/or online content management service 130.

In some embodiments, message management service 104 can manage a draft and version information by performing draft processing operations as described herein. Message management service 104 can receive a request (e.g., an instruction) to perform an action of managing a draft of an electronic document, or can receive a request via online content management service 130. For example, a client can operate an app that enables a user to compose a draft of an electronic document. The app can communicate with online content management service 130 to synchronize the draft with message management service 104. Online content management service 130 can perform operations described herein as being performed by message management service 104. Online content management service 130 can process a request from the app and send the request to message management service 104 to manage and/or synchronize a version of a composed draft.

In some embodiments, a client can present an interface that displays information about draft electronic documents that are stored on the client. The information can indicate a number of drafts stored by the client and/or in association with an account. The information can be presented with other messages that have been sent, such as messages associated with an account of a user. In some embodiments, information identifying a draft can be presented with a message to which the draft is based on (e.g., a reply to a message). All or part of a draft of a message (e.g., a preview of a draft) can be displayed with or without other documents and/or messages associated with an account.

In some embodiments, a client can display an interface (e.g., a graphical user interface) that enables a user to perform one or more actions (e.g., storing, sending, deleting, or composing) with respect to a draft of a message. The interface can present a draft of an electronic document in a format corresponding to a type of message (e.g., an email message) or the draft can be presented as an electronic document (e.g., a note, a calendar invitation, or other type of document). The interface can enable a user to specify one or more additional documents (e.g., an attachment) such as an image or a file to be included or associated with the draft. The client can present one or more interactive elements that can enable a user to manage (e.g., edit or delete) a draft. The client can present one or more interfaces that prompt a user to indicate whether to delete or replace a draft when a conflict is detected with a draft synchronized with message management service 104. Examples of interfaces are described below with reference to FIGS. 7-12.

Client 110 can be a desktop computer that can execute an app to communicate with messaging service 102 and/or message management service 104. This app can be, for example, a mail client app built into an operating system of a desktop computer, a web browser that interfaces with a web-based messaging service, a service-specific application provided by the provider of messaging service 102 or the provider of message management service 104, or another app.

A given user can have accounts with both messaging service 102 and message management service 104. The user's account with message management service 104 can be linked to the user's account with messaging service 102, allowing the user to use message management service 104 to manage messages 120 sent and received via messaging service 102. In some embodiments, a user can have multiple accounts with one or more messaging services 102 and can link any or all of these accounts to a single account with message management service 104. In some embodiments, a given user can have accounts with both messaging service 102 and/or online content management service 130. In such embodiments, the user's account with messaging service 102 can be linked or associated with the user's account with online content management service 130. In some embodiments, an account of one user can be linked with an account of a different user. The account of each user can be associated with or provided by message management service 104 or online content management service 130. Such linking or association of the accounts can enable the user to manage a draft of an electronic document from a client that can access message management service 104 and/or online content management service 130. Thus, a user can compose a draft of an electronic document from one client that can access message management service 104 and can continue composing or can delete the draft from another client that can access online content management service 130. In some embodiments, a user can have a single account providing access to both message management service 104 and online content management service 130.

Figure 2:
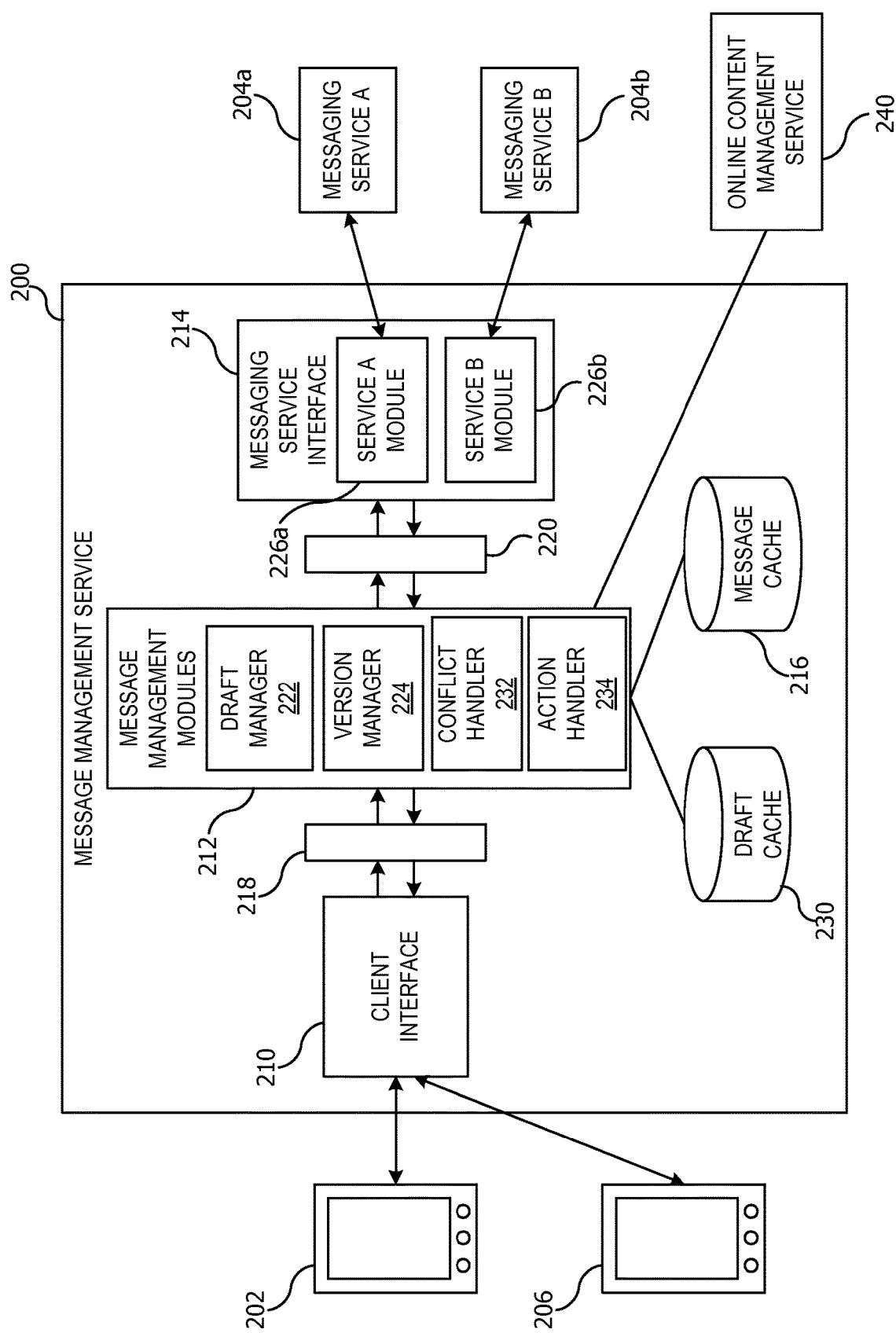
FIG. 2 shows a block diagram of a message management service according to an embodiment of the present invention.

FIG. 2 shows a block diagram of a message management service 200 according to an embodiment of the present invention. Message management service 200 can implement message management service 104 of FIG. 1. For example, message management service 200 can act as an intermediary between one or more clients, such as client 202 (e.g., implementing client 108) and client 206 (e.g., client 110 of FIG. 1), and various messaging services 204a, 204b (e.g., implementing messaging service 102) of FIG. 1. Each service 204a, 204b can be a different messaging service, such as different email services, an email service and a social network service, and so on. While two messaging services 204 are shown, any number of messaging services 204 can be supported by a single message management service 200.

Message management service 200 can include client interface 210, message management modules 212, messaging service interface 214, message cache 216, and draft cache 230. Client transfer layer 218 can provide transfer queues for transferring messages and other instructions and information between client interface 210 and message management modules 212, and service transfer layer 220 can provide transfer queues for transferring messages and other instructions and information between message management modules 212 and messaging service interface 214.

Client interface 210 can communicate with multiple instances of client 202 (e.g., clients associated with different users and/or multiple clients associated with the same user). For instance, client interface 210 can deliver "inbound" messages from messaging services 204a, 204b to client 202, receive "outbound" messages from client 202, and/or receive various message processing instructions from client 202, such as instructions to defer a message.

Message management modules 212 can include functional blocks or modules configured to perform various operations on messages received by message management service 200, including outbound messages received from client 202 as well as inbound messages received from messaging services 204a, 204b. Message management modules 212 can be configured to perform one or more operations to manage drafts of electronic documents. For example, message management modules 212 can include draft manager 222, version manager 224, conflict handler 232, and action handler 234.

Messaging service interface 214 can include various service modules 226a, 226b, each of which can be configured to communicate with a different one of messaging services 204a, 204b. For example, different messaging services 204 can support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages it receives for the user's account to message management service 200. Persistent connections to other services than IMAP can also be maintained, or messaging service interface 214 can periodically poll messaging services 204 to obtain new messages. The persistent connection can be maintained regardless of whether the user currently has any client 202 connected to client interface 210, and message management service 200 can maintain synchronization with messaging services 204.

Message cache 216 can be a database or other data store that provides storage and retrieval of messages. For example, messages can be stored and retrieved by reference to message identifiers (message IDs) assigned to each message by message management service 200 and/or messaging services 204. Message management service 200 can use message cache 216 to store copies of messages that are likely to be of interest to a client, such as recently received messages or messages found in a user-initiated search. Messaging services 204 can maintain their own message stores independently of any action by message management service 200. In some embodiments, messaging service 204 can maintain a primary store of messages for a user that can include all messages currently associated with that user's account (e.g., including sent messages, received messages, archived messages, etc.), and message cache 216 can store a subset of the user's messages as well as information about additional messages in the primary store. If client 202 requests a message that is not presently stored in message cache 216, message management service 200 can retrieve the message from the appropriate messaging service 204 and deliver it to client 202.

Draft cache 230 can be a database or other data store that provides storage and retrieval of one or more drafts of electronic documents. For example, a draft of an electronic message can be stored and retrieved by reference to drafts (e.g., document identifiers) assigned to each draft by message management service 200. Message management service 200 can use draft cache 230 to store a draft of an electronic document that has been composed using a client. A draft of an electronic document can be stored in association with version information that indicates a version of the draft. Message management service 200 can update the version information corresponding to a current version of the draft synchronized by message management service 200. The version information can indicate a version of the draft stored by each client that has a draft or that previously had a draft. The version information can be used to identify draft as a current draft. A draft can be updated or deleted corresponding to updates of the draft on a client.

In some embodiments, draft cache 230 can store drafts of electronic documents without association with or shared with storage of actual messages. In other words, a draft may not consume storage allocated for messages, such as storage associated with or allocated to an account managed by message management service 200 and/or an account (e.g., an email account) with messaging services 204. A draft of an electronic document can be stored in association with an account of a user. The account can be associated with an account provided by one of messaging services 204. In some embodiments, draft cache 230 can correspond to storage that is separate (e.g., physical or logically separated) from storage for messaging services 204. Storage for messaging services 204 can include messages stored for a user including those associated with the user's account (e.g., including sent messages, received messages, archived messages, etc.). In some embodiments, a draft of a message can be stored in association with a message to which the draft is related (e.g., a draft reply to a message).

In operation, message management service 200 can obtain inbound messages from messaging services 204 and provide the messages to client 202. Message management service 200 can also receive outbound messages (e.g., messages to be sent) from client 202 and provide the messages to messaging service 204 for delivery to the recipient(s). Message management modules 212 can perform various operations on inbound and/or outbound messages.

For example, in some embodiments, message management modules 212 can operate to manage a draft of a message between clients, e.g., client 202 and client 206. A draft can be received from a client, e.g., client 202. The draft can be composed as an electronic document. The electronic document can be later included in or sent as a message. Alternatively or additionally, the draft can be composed in response to a message associated with an account provided by one of messaging services 204 or the draft can be composed as a new message. In some embodiments, a draft can be composed based on a draft of a message stored in association with an account of one of messaging services 204. In some embodiments, a draft can be composed based on an existing electronic document that associated as a draft of a message.

Message management modules 212 can receive a draft from a client in which the draft includes version information. The version information can indicate the version of the draft composed using the client, stored by the client and/or by other clients, or combinations thereof. The version of the draft on a client can be updated at the client when the draft is composed. In some embodiments, the version of a draft can be updated by a client when the client successfully sends information indicating an update to the draft (e.g., modification or deletion of the draft).

In some embodiments, draft manager 222, can manage and synchronize a draft of a message between clients, e.g., client 202 and client 206. For example, draft manager 222 can manage storage of draft of a message based on version information. When received, a draft can be managed in storage by association with an account, e.g., an account provided by message management service 200, an account provided by one of message services 204, or an account provided by online content management service 130.

Version manager 224 can manage version information associated with a draft. A draft and the version information received from a client can be stored locally in draft cache 230. The version information can include a version of the draft composed using or stored by each client. Each client can manage version information of the draft stored by or composed using the client and version information of a draft stored by or composed using each of the other clients. When a draft is modified or deleted, the version information can be received from a client. The version information can include a version of the draft stored by each client.

In some embodiments, version manager 224 can compare the version information received from a client to the version information stored locally in association with a draft of the message. The version information received with a change can be compared with the version information stored locally. For example, the version of the draft stored by each client can be compared to the version information received from a client. Other than the client from which a draft is received, a difference in the version of the draft stored by any client can indicate that the draft has changed on another client. In such an instance, a conflict can be detected. When the version information for each client matches the version information stored locally by message management service 200, draft manager 222 can store the changed draft and the version information received from client 202. When a draft is deleted, the draft can be deleted from local storage and the version information can still be maintained to synchronize the update to the other clients. Draft manager 222 can initiate an update to other clients, e.g., client 206, to indicate a revision or a deletion of a draft. The update can include the version information stored for the draft.

Based on the version information received with a change to a draft, when the version stored by each client does not match the version information stored locally by message management service 200, version manager 224 can detect a conflict. A conflict (e.g., an "edit conflict" or a "composition conflict") can arise when a version of the draft has been changed by one client before a different device can synchronize a change to a version of the draft on the different device. In some embodiments, message management service 200 can receive updates to a draft of a document from different clients, sometimes in an order that is different from an order in which the updates where made to the draft. Updates to a draft of a message can be received at different times from clients based on whether each client can communicate with message management service 200 when draft has been updated. For example, a user of an app on client 202 can compose a draft of an electronic document. The user can use an app on client 206 to revise the draft of the electronic document that has been composed by client 206. In this example, client 206 can lose connectivity with message management service 200, such that client 206 does not receive a new version of the draft composed using client 202. As such, client 206 can synchronize its version of the draft, which is composed based on an older version of the draft composed using client 202. When client 206 synchronizes its version of the draft, message management service 200 can detect a conflict such that the version information provided by client 206 is not in-sync with the version information by a draft later composed by client 202.

Conflict handler 232 can perform one or more operations to resolve a conflict between an update to a draft of a message received from a client and a draft of the message stored locally by message management service 200. In some embodiments, conflict handler 232 can perform one or more actions for handling a conflict. For example, conflict handler 232 can chose a draft to replace a draft that is stored locally by message management service 200 or conflicting drafts can be stored. In another example, conflict handler 232 can send a message to one or more clients to cause the client(s) to prompt a user to choose one of the conflicting drafts or to enable a user to save each of the conflicting drafts. In some embodiments, message management service 200 can automatically save each conflicting draft and notify the user to choose a draft to proceed with.

Action handler 234 can process requests received from a client to perform one or more actions using a draft of an electronic document. For example, a client can request an electronic document to be sent as a message. In another example, a client can request an electronic document to be stored as an electronic note or stored in a format of another type of electronic document. In yet another example, a client can request that an electronic document be used as content for an electronic invitation.

In some embodiments, request from a client can include a draft of a message and/or can indicate a draft desired to be sent as a message. The request can include information identifying one or more senders and/or one or more recipients of the message. In some embodiments, a draft can include one or more senders, one or more recipients, or both. Alternatively or additionally, one or more senders, one or more recipients, or both can be identified based on information associated with an account of a user. The request can include information identifying an account (e.g., an email account) of the sender(s) for sending the message. Action handler 234 can request one of the messaging services 204 to send the message to the recipient from the account of the sender. The account of the sender can be an account provided by message management service 200. The account can be used to identify an account provided by a message service.

In some embodiments, a request from a client can include information for an electronic invitation. The request can include information identifying one or more senders and/or one or more recipients of an electronic invitation. In some embodiments, a draft can include one or more senders, one or more recipients, or both. Alternatively or additionally, one or more senders, one or more recipients, or both can be identified based on information associated with an account of a user. The request can include information identifying an account (e.g., an email account) of the sender(s) from which to send the invitation. Action handler 234 can request one of the messaging services 204 to send the message to the recipient from the account of the sender. The account of the sender can be an account provided by message management service 200. The account can be used to identify an account provided by a message service.

It will be appreciated that message management service 200 is illustrative and that variations and modifications are possible. For example, other message management modules and/or operations can be provided. In some embodiments, message management can include windowing (selecting and immediately delivering to a client a fixed number of messages deemed likely to be relevant, such as the 50 or 100 or some other number of most recent messages), backfilling (populating message cache 216 with messages in anticipation of client requests), message format conversion (e.g., converting between a message format used by a messaging service and a format optimized for display on a client), management of message folders or streams, message sorting, management of drafts of electronic documents, management of attachments, synchronization with messaging services 204 (e.g., relaying instructions from client 202 to move or modify messages) and so on.

Figure 3:
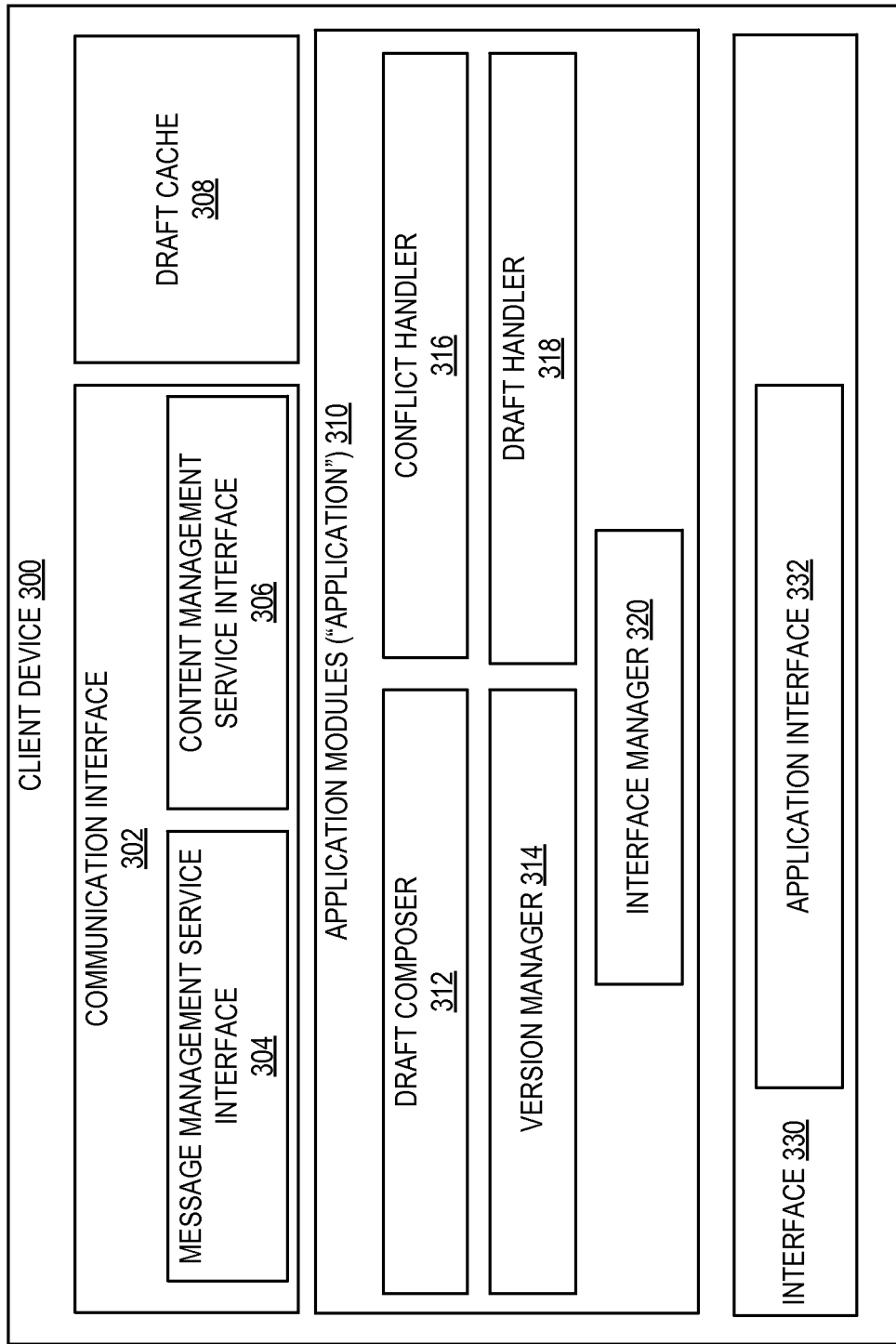
FIG. 3 shows a block diagram of a client device according to an embodiment of the present invention.

FIG. 3 shows a block diagram of client device 300 according to an embodiment of the present invention. Client device 300 can implement any of client devices 108, 110 of FIG. 1 or client devices 202, 206 of FIG. 2. Client device 300 can be a user-operated computing device that can be implemented using hardware, firmware, software, or combinations thereof to interact with online content management service 130, message management service 104, and/or messaging service 102. Examples of client device 300 can include, without limitation, a desktop computer, a laptop computer, a tablet computer, a smart phone, a wearable computing device, a personal digital assistant, and so on. Client device 300 can include interface 330. Interface 330 can include a physical interface, a graphical interface (e.g., a graphical user interface), or a combination thereof.

In some embodiments, client device 300 can provide access to application 310 ("app"). App 310 can enable a user to access and perform enhanced functions provided by one or more management services, e.g., message management service 200 or online content management service 130. For example, app 310 can be customized to allow access to enhanced functions such as managing a draft of an electronic document. App 310 can be accessed via interface 330 of client device 300. In some embodiments, interface 330 can include or implement application interface 332 (e.g., a graphical interface), which enables operation of app 310.

In some embodiments, application interface 332 can enable a user operate app 310 to perform one or more actions to view, manage, and/or compose a draft of an electronic document as described herein. When client device 300 receives a request via application interface 332 to perform one or more actions to manage a draft, app 310 can process the request to perform the action(s). An action can include client device 300 communicating appropriate instructions (e.g., including a draft and version data of the draft as described below) to message management service 104 and/or online content management service 130. In some embodiments, application interface 332 can present a draft of an electronic document in a format corresponding to a type of message (e.g., an email message) or the draft can be presented as an electronic document (e.g., a note, a calendar invitation, or other type of document). Examples of application interfaces (e.g., application interface 332) implemented for app 310 are described below with reference to FIGS. 7-12.

Client device 300 can implement communication interface 302 that includes functional blocks or modules, each of which can be configured to handle communications for client device 300, e.g., communications different types of management services. In some embodiments, communication interface 302 can implement other interfaces, such as a network interface, web interface, or other remote communication interface, to enable app 310 to communicate with a management service. For example, communication interface can include content management service interface 306 and/or message management service interface 304. Each interface 304, 306 can be configured to use an appropriate protocol for communication with a type of management service. Message management service interface 304 can be configured to communicate with a message management service, e.g., message management service 200. Content management service interface 306 can be configured to communicate with a content management service, e.g., online content management service 130. In some embodiments, communication interface 302 can be implemented by app 310 to communicate with a management service.

App 310 can be implemented by one or more application modules. In some embodiments, all or part of the modules of app 310 can be stored and executed locally on client device 300 to operate app 310. For example, all or part of the modules of app 310 can be installed with client device 300 or can be stored after receipt from a computing system, e.g., message management service 200, accessible to client device 300. In some embodiments, all or part of the modules of app 310 can be hosted and executed remotely on a computing system, e.g., message management service 200, accessible to client device 300. A computing system such as message management service 200 can be accessible via communication interface 302. App 310 can communicate with a management service, e.g., message management service 104 and/or online content management service 130, for operation. In some embodiments, app 310 can be, for example, implemented as a client app executing on an operating system of client device 300, a web browser that interfaces with a web-based messaging service, a service-specific application provided by the provider of messaging service 102 or the provider of message management service 104, or another app. For example, app 310 can be implemented by a provider of message management service 104 or online content management service 130, and accessed from client device 300 via application interface 332.

In some embodiments, app 310 can by implemented by functional blocks or modules including draft composer 312, version manager 314, conflict handler 316, draft handler 318, and interface manager 320. Client device 300 can include draft cache 308 to manage storage of drafts of electronic documents and corresponding version information.

Draft cache 308 can be a database or other data store that provides storage and retrieval of one or more drafts of electronic documents. For example, a draft of an electronic message can be stored and retrieved by reference to drafts (e.g., document identifiers) assigned to each draft by client device 300. Client device 300 can use draft cache 308 to store a draft of an electronic document that has been composed using client device 300. A draft can be managed in storage in association with information indicating the version of the draft. The information can indicate a version of the draft stored by each client that has a draft or that previously had a draft. The information can be used to identify draft as a current draft. A draft can be updated or deleted corresponding to updates of the draft on a client. In some embodiments, a draft of electronic document and version information about a version of the draft stored on client device 300 and other client devices can be received from a management service, such as message management service 200.

In some embodiments, draft cache 308 can store drafts of electronic documents without association with or shared with storage of actual messages. In other words, in some embodiments, a draft may not consume storage allocated for messages, such as storage associated with or allocated to an account provided by message management service 200 and/or an account (e.g., an email account) provided by messaging services 204. A draft of an electronic document can be stored in association with an account of a user. The account can be associated with an account provided by one of messaging services 204. In some embodiments, draft cache 308 can correspond to storage that is separate (e.g., physically or logically separated) from storage associated with an account provided by message management service 200, online content management service 130, and/or one or more messaging services 204. Storage for messaging services 204 can include messages stored for a user including those associated with the user's account (e.g., including sent messages, received messages, archived messages, etc.). In some embodiments, a draft of a message can be stored in association with a message to which the draft is related (e.g., a draft reply to a message).

Draft composer 312 can perform operations to compose a draft of an electronic document. A draft of an electronic document can be composed based on input received via application interface 332. Based on input received via application interface 332, draft composer can create or modify a draft of an electronic document. In some embodiments, draft composer 312 can generate a draft of an electronic document according to a format of a particular type of electronic document, such as a message. Draft composer 312 can manage storage of a draft in draft cache 308.

Interface manager 320 can perform operations to generate and/or display application interface 332 via interface 330. Interface manager 320 can process input received via application interface 332 to manage a draft of an electronic message. Such input can be provided to any other modules or functional blocks of app 310 to manage a draft of an electronic document.

Version manager 314 can store data in draft cache 308 that includes version information about a version of each draft of an electronic document stored by client device 300. Version information can include a value that indicates a version of a draft stored by client device 300. Version manager 314 can assign a value corresponding to a version of a draft composed by client device 300. The value can be adjusted to reflect a version corresponding to an update or composition of a draft of an electronic message. In some embodiments, version information can be stored even after a draft of an electronic document has been deleted (e.g., not associated with an account of a user).

Version manager 314 can store version information received from a management service, such as message management service 200 or online content management service 130. The version information can be received with a draft of an electronic message. In some embodiments, the version information can indicate a version corresponding to a draft of an electronic message stored by each client device. The version information can be managed by a management service, such as message management service 200, to manage synchronization of drafts between client devices. In some embodiments, version manager 314 can present a current draft of an electronic document based on the draft received from message management service 200. When a draft received from message management service 200 is further composed using client device 300, version manager 314 can manage version information for the composed draft. When a draft is composed by client device 300, the draft and its corresponding version information can be sent to message management service 200 to manage synchronization of the draft with other client devices.

In some embodiments, conflict handler 316 can detect and/or manage a conflict with a draft of an electronic document stored by client device 300 and a draft of the electronic document stored by other client devices and/or a management service, such as message management service 200. For example, conflict handler 316 can determine whether a version of a draft stored by client device 300 is different from another client device or a management service. In some embodiments, such a determination can be made by comparing a version of the draft stored by each client device to the version information stored by client device 300. The version of the draft stored by each client device can be compared to version information stored by client device 300, which indicates a version of the draft stored by client device 300 and each of the client devices. Conflict handler 316 can detect a conflict when a version of a draft stored by a client device does not match locally stored version information that indicates a version of the draft stored by that client device. As such, a conflict may be detected when version information for a draft stored by client device does not match version information stored by message management service. In some embodiments, conflict handler 316 can resolve a conflict with a draft of an electronic message by storing both conflicting drafts or by choosing a conflicting draft.

In some embodiments, conflict handler 316 can cause interface manager 320 to present application interface 332 with information indicating a conflict. In some embodiments, conflict handler 316 can cause interface manager 320 to present application interface 332 with one or more options for resolving the conflict. One option can include enabling a user to choose via application interface 332 one of the conflicting drafts.

Draft handler 318 can perform operations to perform actions for using a draft of an electronic document. Draft handler 318 can perform an action to use a draft based on input received via application interface 332. One action can include storing a draft of an electronic document in a format for a particular type of electronic document (e.g., an electronic note or an electronic message). Another action can include sending a message that includes a draft of an electronic document. The draft can be include in a message or converted to a format of a message. Input received via application interface 332 can be used to provide other parameters of the message including a recipient. In some embodiments, a recipient address (e.g., email address) can be identified based on information identifying a recipient received via application interface 332. A draft of an electronic document can be sent as a message using an account associated with a user operating client device 300. The account can be provided by message management service 200 or a messaging service. In some embodiments, draft handler 318 can send one or more instructions to message management service 200 to send a draft of an electronic document as a message. Message management service 200 can send the message via an account associated with a user. In some embodiments, draft handler 318 can send one or more instructions directly to a messaging service to send a draft of an electronic document as a message from an account provided by the messaging service. Other actions for using a draft of an electronic document can include generating an electronic invitation from the draft and/or sending the invitation to one or more recipients.

Figure 4:
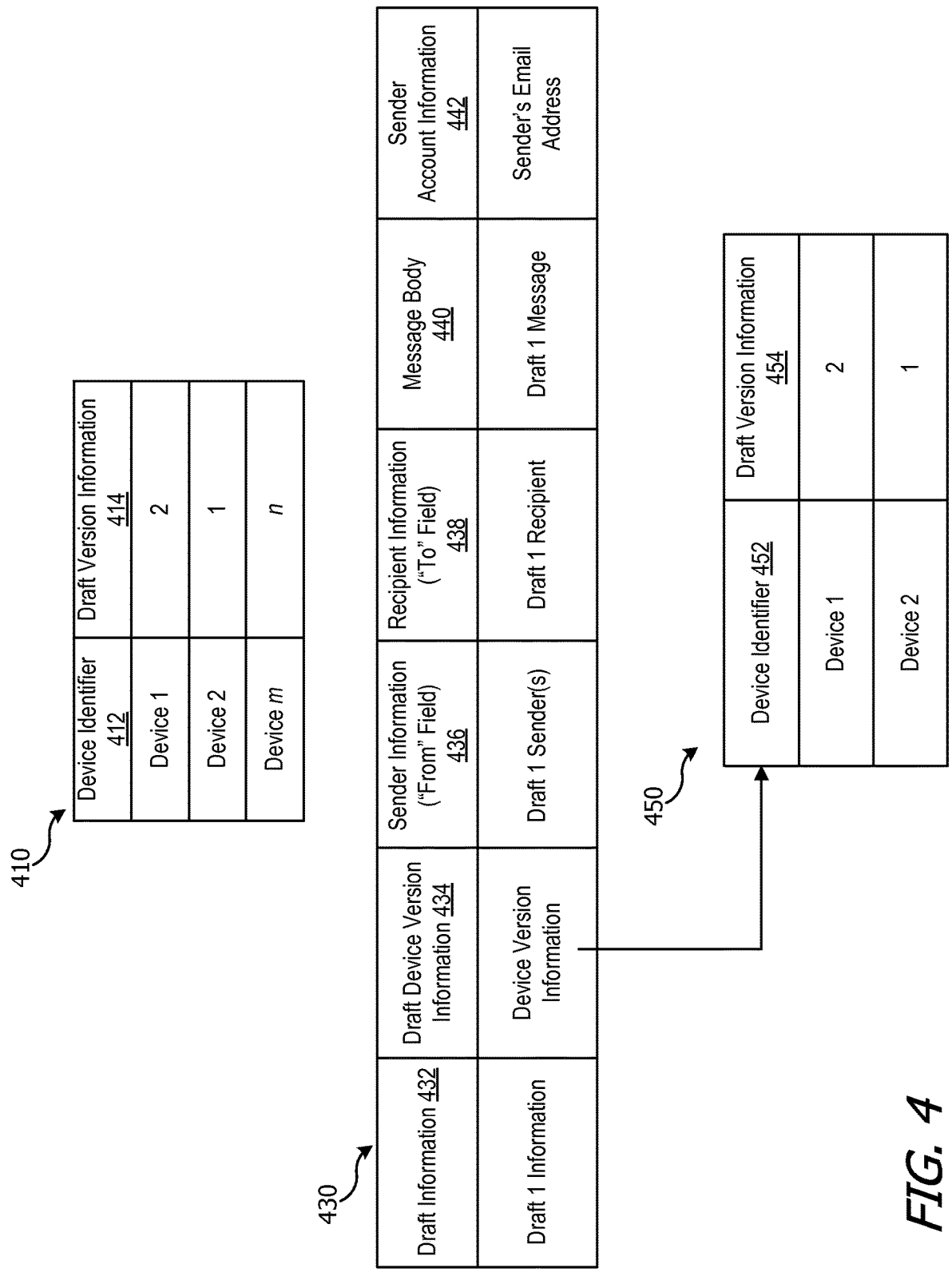
FIG. 4 shows a block diagram of various data structures for managing drafts of an electronic document according to an embodiment of the present invention.

FIG. 4 shows a block diagram of various data structures for managing drafts of an electronic document according to an embodiment of the present invention. Each of the data structures shown in FIG. 4 can be implemented as one of many types of data structures including, without restriction, an array, a record, a hash table, a linked list, other types of data structures, or combinations thereof. Data can be stored based on the data structure(s) by any one of clients 202, 206, 300 and/or message management service 200. For purposes of illustration, the data structures in FIG. 4 are described with respect to storage of drafts of electronic messages; however, the data structures can be implemented to store drafts of other types of electronic documents.

In one example, data stored using data structure 410 can indicate version information (e.g., draft version information 414) of one or more client devices storing a draft of a particular electronic document (e.g., a message). Data structure 410 can be implemented for each different electronic document that is drafted using one or more client devices. Data structure 410 can include a number of fields for storing data corresponding to a version of a draft stored by different client devices. In some embodiments, data structure 410 can include information such as a default value, or a place holder value (e.g., a value of "0"), for a client device to indicate that the client does not have a version of a draft of an electronic document. The default value may remain unchanged until a draft of an electronic document is stored on the client device.

In some embodiments, data stored using data structure 410 can indicate version information of a draft stored by message management service 200. The version information can be received with a current version of a draft from message management service 200. In some embodiments, data structure 410 can include information such as a default value, or a place holder value (e.g., a value of "0"), to indicate that the client does not have a version of a draft of an electronic document received from message management service. The default value may remain unchanged until a draft of an electronic document received from message management service 200 is stored on the client device.

In some embodiments, a draft of a message stored on a different client device can correspond to a different version of a draft. The version information can be associated with a client device (e.g., device identifier 412). In one example, such as the example in FIG. 4, a client device having a device identifier (e.g., device identifier "Device 1") can be associated with a version (e.g., version "2") of a draft of a message stored on Device 1 and a different client device having a device identifier (e.g., device identifier "Device 2") can be associated with a version (e.g., version "1") of a draft of the message stored on Device 2. The version of a draft can correspond to a value that indicates a version of a draft stored on a particular client device. In some embodiments, the value representing a version of a draft can be incremented for each new version of a draft that is composed by a client device. Data structure 410 can be implemented by a client to manage storage of data about a draft of an electronic document composed on the client device and the drafts of the electronic document composed by other client devices.

Data stored using data structure 410 can be associated with a draft of the message stored on the client. Data structure 410 can be sent to message management service 200 along with a draft of a message when the draft is updated from a previous version or is composed as a new draft. Version information indicated by data structure 410 can be updated for a draft when a draft is received from message management service 200. In some embodiments, a draft can be received with a data structure structured in a format such as data structure 410. A client can replace or update data structure 410 with the data structure received with a draft of a message. In some embodiments, data structure 410 can be updated or merged with a data structure received with the draft of the message.

Message management service 200 can manage information about a draft of a message using a data structure, such as data structure 430. Data structure 430 is an example of information that can be stored corresponding to drafts of a message that are composed. Data structure 430 can indicate draft information about one or more different drafts being composed on any one of clients accessible to message management service 200.

Data stored using data structure 430 can include draft information 432 about a draft of a message stored by message management service 200. Draft information 432 can include content in a draft such as one or more senders (e.g., sender information 436), one or more recipients (e.g., recipient information 438, and/or a draft message (e.g., message body 440). Data structure 430 can indicate sender account information 442, such as information identifying an account from which to send the draft of a message as an actual message. Account information 442 can include information (e.g., an email address) identifying an account provided by message management service 200, a messaging service, or an online content management service 130.

To manage information about a draft, data structure 430 can include device version information corresponding to a draft (e.g., draft device version information 434). The device version information can be stored in a separate data structure 450. Draft device version information 434 can include data indicating a reference (e.g., a pointer) to storage of data structure 450. Data structure 450 can be similar to or identical in format as data structure 410. Data stored using data structure 450 can indicate version information (e.g., draft version information 454) of one or more devices storing a draft of a particular electronic document (e.g., a message). Data structure 410 can be implemented to store data for a draft of an electronic document that is composed using one or more client devices. The version information indicated by data stored using data structure 450 can be associated with a device (e.g., device identifier 452). The version information can indicate a version of a draft composed using a client device. The version information can be stored in association with device identifier 452 of the client device that composed a version of a draft. In some embodiments, data structure 450 can be updated or replaced by data structure 410 for a draft composed using a different client device. In some embodiments, data stored based on data structure 450 can be appended or updated based on data stored using data structure 410 that is received for a draft composed by a client device.

Data stored using data structure 450 can be sent to a client with draft information included in data structure 430. Data structure 410 can be updated by with data structure 450 when received with a draft from message management service 200. The draft information about a draft of a message can be stored in a data structure similar or identical to data structure 430.

A draft when received from client can be included with data structure 410. In some embodiments, for example, when a draft is received from client 202, message management service 200 can compare data stored using data structure 410 to data stored using data structure 450 to determine whether a draft has been updated by client 202 at a given point in time. The version information in the data structure 410 can be compared to the data structure 450 matches for a version of the draft at a given point in time. In some embodiments, when the version of the draft of other clients besides client 202, identified in data structure 410 does not match the version of the draft of the other clients identified in data structure 450, message management service 200 can determine that a version of the draft received from client 202 is based on a previous version of the draft (e.g., an older version or an out-of-sync version of the draft). A conflict can be detected when a draft received from client 202 is based on a previous version of the draft that has since changed. Examples are described below of message management service 200 and/or client device 300 using data structures, such as data structure 410 and data structure 450 to manage a draft of an electronic document.

Figure 5:
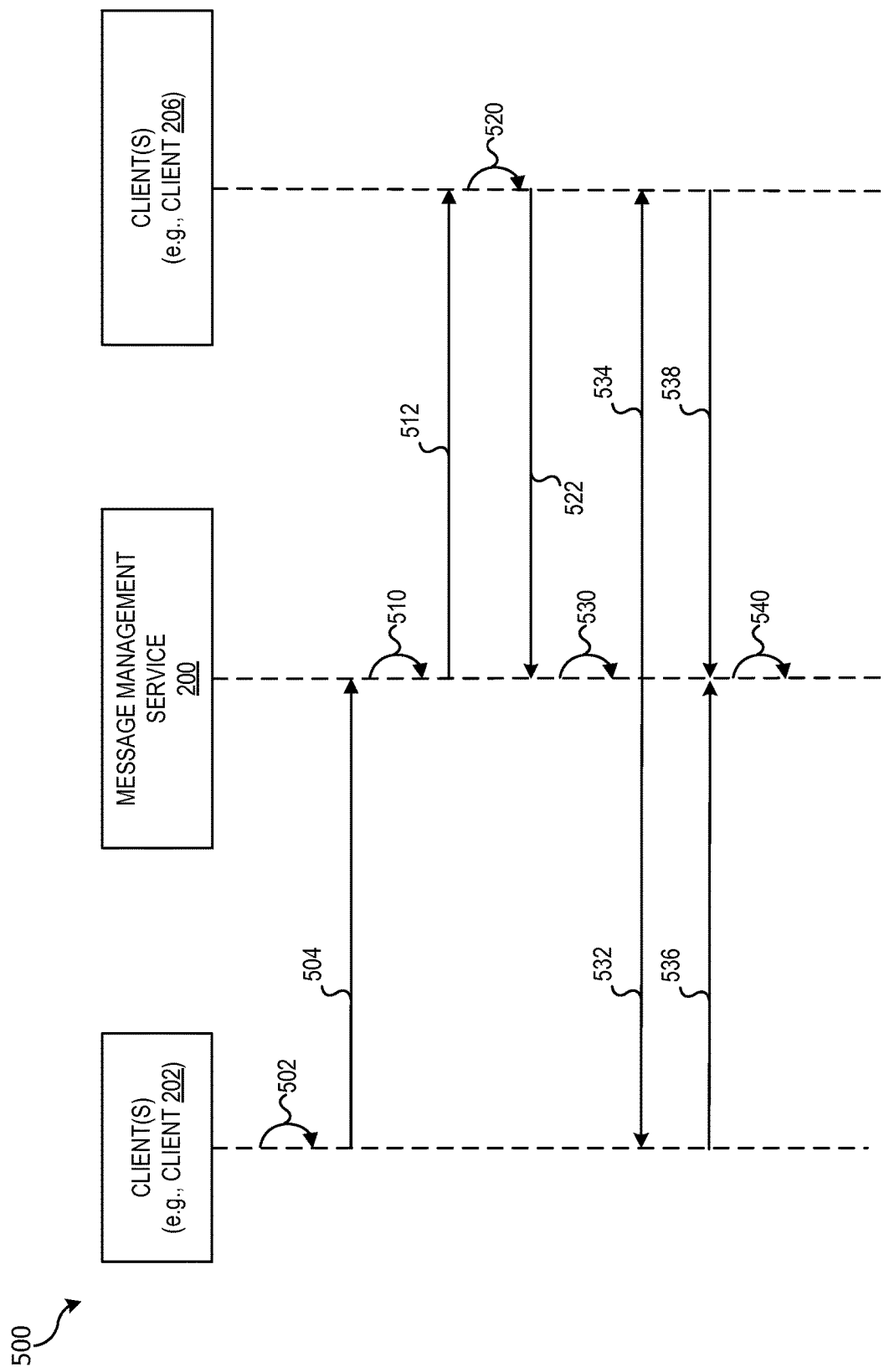
FIGS. 5 and 6 each show a sequence diagram of operations to manage drafts of an electronic document according to some embodiments of the present invention.
Figure 6:
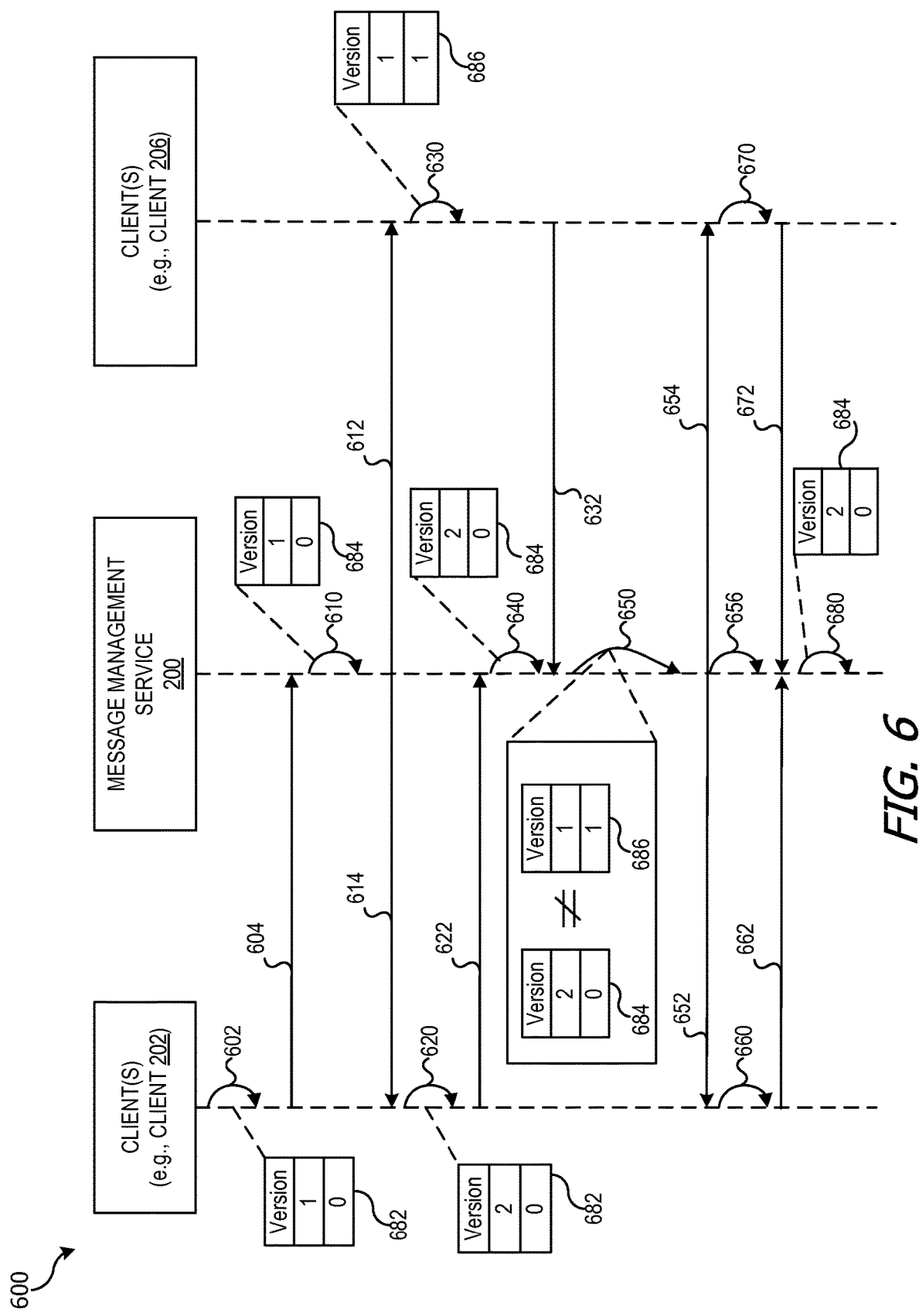

FIGS. 5 and 6 each show an example of a sequence of operations performed to manage drafts of an electronic document according to some embodiments of the present invention. Specifically, FIG. 5 shows a sequence of a process 500 for synchronizing a draft of an electronic document between different clients (e.g., client 202 and client 206). Specifically, a management service, such as message management service 200, can synchronize drafts between clients. For example, process 500 can maintain a current version of a draft that is composed using more than one client, e.g., client 202 and client 206. In the example described with reference to FIG. 5, a draft, once initially composed by a client can be managed by storing information in data structures such as those described with reference to FIG. 4.

Process 500 can begin by one client, such as client 202, performing one or more operations 502. For example, operation 502 can include receiving a request to compose a draft of an electronic document from a user. In some embodiments, the request can specify an existing draft to edit or a new draft to begin composing. In some embodiments, a user can compose a draft of an electronic document by interacting with one or more of the interfaces described with reference to FIGS. 7-12 to operate client 202. In some embodiments, when the user composes the draft at 502, data in a data structure associated with the draft can be managed (e.g., creating, updating, and/or removing) automatically by the client and/or manually by the user. The data in the data structure can include version information for the draft and a device identifier corresponding to client 202.

In some embodiments, after a draft has been composed and/or updated at operation 502, client 202 can synchronize the draft with message management service 200 at operation 504. In some embodiments, client 202 can send the entire contents of the draft to message management service 200. In some embodiments, when an existing draft has been updated, client 202 can send the updates made to the existing draft. In some embodiments, the version information maintained by client 202 in the data structure can include version information corresponding to the version of the draft being synchronized at operation 504. In some embodiments, the version information can include data corresponding to any versions of the draft previously stored by another client, e.g., client 206. In some embodiments, when drafts are synchronized across multiple clients 202, 206, message management service 200 can include version information for each client.

Process 500 can include message management service 200 performing one or more operations 510 to manage storage of data corresponding to a draft composed by a client. For example, message management service 200 can store the version information received from client 202 at operation 504 in a data structure (e.g., data structure 430) maintained by message management service 200.

Process 500 can further include message management service 200 performing one or more operations 512 to synchronize a draft of an electronic document with clients 202, 206. For example, message management service 200 can synchronize a draft of electronic document with clients associated with an account of a user. Operation 512 can include communicating data corresponding to one or more drafts composed using client 202 to client 206. In some embodiments, message management service 200 can periodically or intermittently send a draft of a document and the draft's corresponding version information to each client associated with the user's account.

In some embodiments, client 206 can perform one or more operations 520 for process 500. Operation 520 can include storing data received from message management service 200, such as drafts of electronic documents and version information associated with those drafts. In some embodiments, operation 520 can include comparing the version information for the draft of an electronic document received from message management service 200 to version information corresponding to a draft of the electronic document previously composed by the client. Client 206 can compare version information to detect a conflict between a client's locally stored draft and a version of the draft received at operation 512 from message management service 200. Examples of a client detecting a conflict are described below with reference to FIG. 6.

A draft composed by one client, e.g., client 202, can be further composed (e.g., edited or revised) by another client, e.g., client 206. For example, operation 520 can include client 206 updating a draft of an electronic document that was created by client 202. Client 206 can then store version information corresponding to the updated version of the draft composed by client 206. In some embodiments, version information for an existing draft can be updated (e.g., incremented) to a new value that reflects the version of the draft composed by client 206.

Process 500 can include client 206 performing one or more operations 522 to communicate with message management service 200 to send data corresponding to a draft composed by client 206 and version information corresponding to the draft.

Message management service 200 can perform one or more operations 530 using the data received via operation 522. Similar to operation 510, operation 530 can include storing the data (e.g., a draft and corresponding version information) received from a client, e.g., data received via operation 522. Operation 530 can include updating, based on the received data via operation 522, the data including the version information corresponding to a previously stored draft. In some embodiments, operation 530 can include determining whether the draft received from client 206 conflicts with a draft previously stored by message management service 200. Examples of operations performed by a management service, e.g., message management service 200, are described below with reference to FIG. 6.

Process 500 can include message management service 200 performing operation 532 and operation 534 to communicate data about one or more drafts to client 202 and client 206, respectively. For example, message management service 200 can send information to client 202 and client 206 indicating that a conflict has been detected between two drafts. The data communicated to a client can include the draft of an electronic document stored by message management service 200, such as the draft stored by operation 530, and corresponding version information.

Process 500 can further include a client, e.g., client 202 or client 206, performing one or more operations 536 or one or more operations 538, respectively, to request an action to be performed related to use of a draft. For example, a client can request message management service 200 to send the draft as an electronic message (e.g., an email message). A client can request other actions to be performed on a draft, such as storing a draft in a particular type of format. A request from a client can include information identifying a recipient of a message. The information can include contact information, an email address, or other information about a recipient.

Process 500 can include message management service 200 performing one or more operations 540 in response to the action requested by a client device. For example, operation 540 can include sending a draft of an electronic document as a message as requested by operation 536 or operation 538. Operation 540 can include generating a message that includes the current draft of the electronic document to be sent to a messaging service, e.g., messaging service 204, and sending the generated message, from an account (e.g., a messaging account) associated with a user of a client that requests the message to be sent.

It will be appreciated that process 500 is illustrative and that variations and modifications are possible. Steps described as sequential can be executed in parallel, order of steps can be varied, and steps can be modified, combined, added or omitted. Steps described as being performed by a single operation can be performed by multiple operations. The processes can be performed by various computer systems, including a client computer system, a server computer system of a message management service, a server computer system of a messaging service, and/or a server computer system of an online content management service. In some embodiments, different portions of the processes can be performed by different computer systems.

Now turning to FIG. 6, a sequence of a process 600 for synchronizing a draft of an electronic document between different clients (e.g., client 202 and client 206). Message management service 200 can perform synchronization of drafts between clients, such as maintaining a current version of a draft of an electronic document based on drafts of the electronic document that are composed using multiple clients, e.g., client 202 and client 206. Message management service 200 can determine whether a version of a draft composed by client 202 has been edited based on a current version of a draft that can be stored by message management service 200. In some embodiments, a conflict can be detected for a draft of an electronic document edited by a client based on whether the draft is based on a current version of the draft stored by message management service 200 or a previous version of the draft stored by a client. Message management service 200 can perform operations to resolve detected conflicts. Process 600 illustrated in FIG. 6 provides one example in which a conflict is detected between drafts of an electronic document composed using different client devices and the operations that can be performed to resolve the conflict.

Process 600 can begin by a client, such as client 202, performing one or more operations 602 to compose a draft of an electronic document using a client. Operation 602 can include storing the draft (e.g., a new draft or an edited draft) on the client and managing version information corresponding to the draft.

Process 600 can implement an algorithm, such as vector clocks, to manage synchronization of drafts of an electronic document. To implement the algorithm, one or more data structures can be implemented to store version information for synchronization of drafts. For example, a client can store version information using data structure, e.g., data structure 682 or data structure 686. In some embodiments, each of data structures 682, 686 can store version information as described with respect to data structure 410 of FIG. 4. In the example shown in FIG. 6, client 202 an update data structure 682 to indicate a value (e.g., a value of "1") corresponding to the draft composed by client 202. In this example, data structure 682 includes version information for the draft stored by client 202 since the draft is new and a default value (e.g., a value of "0") corresponding to version information for other clients, e.g., client 206, which currently do not store a version of the draft. In some embodiments, each of data structures 682, 686 can store a default value, or place holder value (e.g., a value of "0") corresponding to an electronic document. The default value can indicate that a client does not store a draft of the electronic document. The default value can be updated with a value corresponding to a draft of the electronic document when a draft is stored by client 202.

In some embodiments, data structure 682 can be updated to indicate version information for a current version of a draft stored by message management service 200. The version information can be received with the current version of the draft from message management service 200. When a version of a draft has not been received from message management service 200, data structure 682 can be updated to indicate a default value corresponding to the current version of the draft stored by message management service 200. The default value may remain unchanged until a draft of an electronic document is received from message management service 200 and stored on client 202.

After a draft has been composed by client 202, client 202 can send the composed draft and the version information in data structure 682 with message management service 200, at operation 604. At operation 610, message management service 200 can store the composed draft of the electronic document as a current version of a draft of the electronic document. Message management service 200 can also store version information from data structure 682 into a data structure 684 managed by message management service 200. In some embodiments, data structure 684 can include version information indicating a version of the draft currently stored by each client, e.g., client 202 and client 206. Data structure 684 can be implemented as data structure 430 of FIG. 4. In some embodiments, data structure 684 can be updated to indicate a current version of a draft stored by message management service 200. When a version of a draft has not been stored by message management service 200, data structure 684 can store a default value. The default value may remain unchanged until a draft of an electronic document received from a client. In the example of FIG. 6, data structure 664 can be updated to indicate a current version of a draft (e.g., a value of "1") for the draft received from client 202.

Message management service 200 can perform one or more operations 612, 614 to synchronize the current version of the draft with clients 202, 206, respectively. For example, operation 612 and operation 614 can include sending the current version of a draft to client 202 and client 206, respectively. In this example, the current version of the draft stored by message management service 200 corresponds to the draft previously composed by client 202 at operation 602. The current version of the draft can be sent to other clients, such as client 206, for synchronization of the current version of the draft with those clients. Synchronizing the current version of the draft with clients, such as client 206, can include sending a current version of the draft along with version information in data structure 684 corresponding to the draft.

Clients 202, 206 can perform operations for process 600 based on a current draft and version information for the current draft received from message management service 200. For example, client 202 and client 206 can perform operation 620 and operation 630, respectively. In some embodiments, operation 620 and operation 630 can be performed concurrently or at different times. Operation 620, 630 can include composing an updated draft based on the current version of the draft received from message management service 200. Each of clients 202, 206 can store version information corresponding to the updated draft composed by the respective client. For example, client 202 can update data structure 682 to indicate a version (e.g., a value of "2") corresponding to the updated draft stored by client 202. The version information in data structure 682 can be updated from a previous version corresponding to the draft stored by the client before composing the updated draft.

In some embodiments, a client, e.g., client 206 or client 202, can store version information of the draft stored by itself as well as other clients. Such version information can be stored based on version information received with a current version of a draft from message management service 200. For example, client 206 can implement data structure 686 to store the version information received from message management service 200, such as a version of the draft (e.g., a value of "1") stored by client 202. At operation 630, client 206 can update the draft composed by another client, e.g., client 202. The draft updated by client 206 can be based on the current version of the draft received from message management service 200. Each client 202, 206 can maintain version information corresponding to a draft composed or updated by a client. For example, data structure 686 can be updated with a version corresponding to the version of the draft (e.g., a value of "1") composed by client 206. The version of the draft can be based on a version of the draft composed by another client, e.g., client 202, at operation 602.

In some embodiments, data structure 686 can be updated to indicate a current version of a draft received from message management service 200. When a version of a draft has not been received from message management service 200, data structure 686 can be updated to indicate a default value. The default value may remain unchanged until a draft of an electronic document received from message management service 200 is stored on client 206.

Each client 202, 206 can perform operations to communicate with message management service 200 to send data corresponding to a draft composed by those clients. In one example, at operation 620, client 202 can send an updated draft based on the current version of the draft received from message management service 200. The updated draft can be sent with the version information in the data structure 682, which is updated with a value of "2" to reflect a version corresponding to the updated draft by client 202. Process 600 can include message management service 200 performing one or more operations 640 to update the current version of the draft stored by message management service 200 with the updated draft received from client 202 at operation 622. Data structure 684 can be updated with the version information received with the updated draft. For example, data structure 684 as shown in FIG. 6 at 640 can includes version information indicating a value of "2" for a version of a draft composed by client 202. In the example of FIG. 6, data structure 684 can be updated from a value of "1" to "2" to indicate an updated draft received from client 202 at 622. A default value of "0" corresponding to client 206 may remain unchanged in data structure 684. The default value can indicate that no version of a draft composed by client 206 has been received by message management service 200.

In some embodiments, one client (e.g., client 206) may send an updated draft of an electronic document to message management service 200 after another client (e.g., client 202) sends an updated draft of the electronic document. The draft edited at operation 630 can be edited based on the current version of the draft received at operation 612. In one example, client 206 may synchronize the draft edited at operation 630 at a later time, by operation 632, when client 206 can communicate with message management service 200. In some embodiments, a client, such as client 206, may not be able to communicate with message management service 200 due to one or more factors that affect the communication capabilities of the client. In such instances, the client and message management service 200 may be unable to synchronize drafts with each other until the client can communicate with message management service 200.

In one example shown by FIG. 6, client 206 sends data corresponding to an updated draft when client 206 can communicate with message management service 200. The updated draft may be sent with version information updated in data structure 686. Data structure 686 can be implemented similar to data structure 682. In this example, client 206 sends an updated draft at 632 after client 202 sends an updated draft at operation 622. Since message management service 200 has updated its current version of the draft based on an updated draft received from client 202 at operation 622, the updated draft sent by client 206 may be based on an older version of the draft (e.g., version information indicating a value of "1") received from message management service 200 and not the current version of the draft stored by message management service 200 at operation 640.

Message management service 200 can perform one or more operations 650 to process data received via operation 632. Operation 650 can include determining whether a draft of an electronic document synchronized from a client, e.g., client 206, conflicts with a draft previously stored by message management service 200 (e.g., a draft stored by operation 640).

In some embodiments, a conflict can be determined at operation 650 by message management service 200 comparing version information (e.g., version information in data structure 686) corresponding to draft of an electronic document received via operation 632 to version information (e.g., version information in data structure 684) corresponding to the update draft of the electronic document stored by message management service 200. Operation 650 can include determining whether version information corresponding to the draft of the electronic document stored by client 206 matches version information corresponding to the draft previously stored by message management service 200. In some instances, such as the example shown in FIG. 6, the version information may not match (e.g., the version information is not equal) because the version information received from client 206 can indicate a version of the draft (e.g., a version having a value of "1") stored by client 202 which may not be the same as the version of the draft (e.g., a version having a value of "2") stored by message management service 200 since operation 640 was performed to update a version of the draft composed by client 202. As a result, message management service 200 can detect a conflict because the current version of the draft of the electronic document stored by message management service 200 was updated and does not match a version of the draft updated by client 206 by operation 630. In some embodiments, message management service 200 may use the version information corresponding to the draft stored by message management service 200 to detect a conflict.

In some embodiments, when data for a draft is received from a client, the data can be compared with data stored for the draft by message management service 200 to determine whether a draft received from client 202 conflicts with a previous draft composed by a client. For example, version information for the updated draft received from client 202 at operation 622 can be compared. Based on determining that the draft of an electronic document received via operation 622 does not conflict with a draft of the electronic document currently stored by message management service 200, process 600 can store the draft received via operation 622 and accordingly update the version information corresponding to the draft.

When a conflict is detected by message management service 200, such as by operation 650, process 600 can include message management service 200 performing one or more operations 652, one or more operations 654, and/or one or more operations 656. Operation 652 and operation 654 can include sending a message (e.g., a notification) to client 202 and client 206, respectively. The message can include information indicating the conflict. The message can include each of the drafts of the electronic document that conflict and the version information corresponding to those drafts. In some embodiments, the message can cause a client to prompt a user to respond to the conflict. The prompt can invite the user to choose an option for handling the conflict. Operation 656 can include resolving the conflict between conflicting drafts of an electronic document. In some embodiments, both conflicting drafts can be stored until a response is received from the client indicating an operation to perform to resolve the conflict. In some embodiments, the currently stored draft can be kept, while the draft (e.g., the draft received via operation 632) that caused the conflict is discarded. The response from the client can include version information corresponding to the conflicting drafts.

Process 600 can include client 202 and client 206 performing operation 660 and operation 670, respectively. Operation 660, 670 can include presenting an interface to a user to indicate that a conflict has been detected based on a message received via operation 652, operation 654. In some embodiments, operation 660, 670 can include prompting a user to choose an option for resolving the conflict. An option can include choosing one of the conflicting drafts.

Process 600 can include client 202 or client 206 performing one or more operations 662 or one or more operations 672, respectively. Operation 662 and operation 672 can include sending a message to message management service 200 to request message management service to perform one or more actions with respect to a draft of an electronic document. The draft can correspond to the draft chosen from amongst the conflicting drafts detected by message management service 200. One action can include sending a message including a draft of an electronic document to one or more recipients. Another action can include storing the draft in association with an account provided by an online content management service (e.g., online content management service 130) or messaging service 102. The version information in data structure 684 corresponding to the draft stored by message management service 200 may be updated to reflect a version of a draft chosen to resolve the conflict.

Process 600 can include message management service 200 performing one or more operations 680 to store a draft chosen as the current version for resolving the conflict. Message management service 200 can update a current version of a draft with the draft chosen for resolution of the conflicting drafts. In some embodiments, data structure 684 can be updated to indicate version information corresponding to the current version of the draft chosen for resolution of the conflict. In some embodiments, the version information corresponding to a draft that is not chosen may be updated to reflect previous version information before detection of the conflict. The version information updated in data structure 684 can be sent to clients 202, 206 to synchronize those clients 202, 206 with the current version information. In one example shown in FIG. 6, message management service 200 can resolve a conflict between a version of the drafts stored by message management service 200 and client 206 by choosing the current version of the draft stored by message management service 200 based on the draft received via operation 622. Data structure 684 is shown in FIG. 6 to illustrate the version information stored upon resolution of the conflict. Data structure 684 can be updated to reflect a current version of the draft stored by client 202 (e.g., a value of "2") and a version of the draft stored by client 206 (e.g., a default value of "0") before the conflict since the draft composed by client 206 at operation 630 is not chosen.

In some embodiments, operation 680 can include perform action(s) requested by a client. The action(s) can include send a message including a draft of an electronic document to one or more recipients. Operation 680 can include sending an instruction to a messaging service (e.g., messaging service 102) to request a message to be sent including the draft of the electronic document. The request can include a messaging account of a user associated with a client requesting the message to be sent. The action(s) requested by a client can include storing a draft of an electronic document in association with an account of an online content management service (e.g., online content management service 130) or messaging service 102.

It will be appreciated that process 600 is illustrative and that variations and modifications are possible. Steps described as sequential can be executed in parallel, order of steps can be varied, and steps can be modified, combined, added or omitted. Steps described as being performed by a single operation can be performed by multiple operations. The processes can be performed by various computer systems, including a client computer system, a server computer system of a message management service, a server computer system of a messaging service, and/or a server computer system of an online content management service. In some embodiments, different portions of the processes can be performed by different computer systems.

Figure 7:
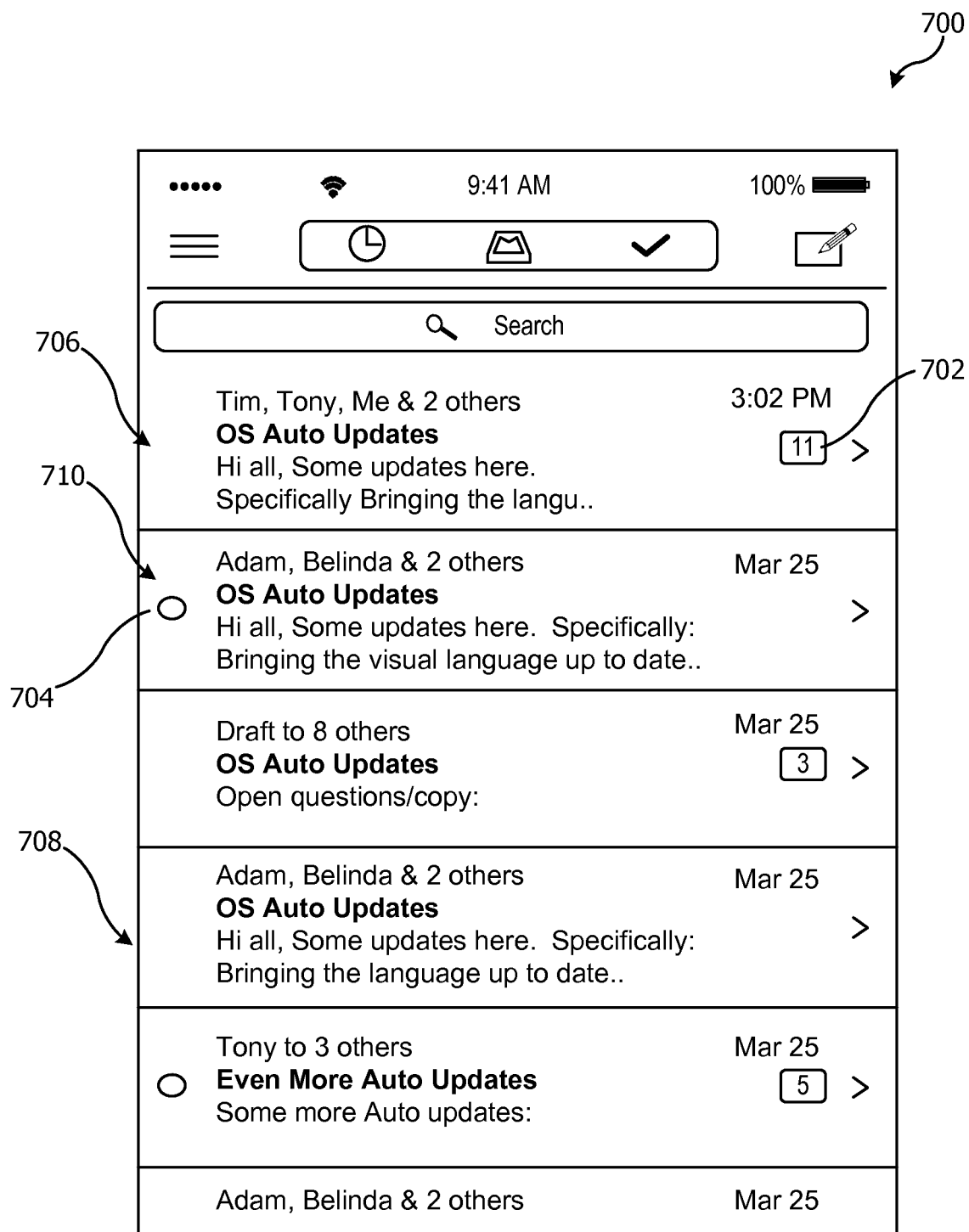
FIGS. 7 and 8 each show an example of an interface for managing drafts of an electronic document according to an embodiment of the present invention.

Examples of managing drafts of a message from a client is described with reference to FIGS. 7-12. FIGS. 7 and 12 show examples of interfaces for managing drafts of an electronic document according to an embodiment of the present invention. FIG. 7 shows interface 700 (e.g., a graphical user interface) that can be displayed on a client device (e.g., client 108 or client 110 of FIG. 1). Interface 700 is an example of an interface that can display information about one or more drafts of electronic documents. In one example, interface 700 can present one or more drafts of messages (e.g., draft 706 or a draft 710). The drafts can be presented with information about one or more messages (e.g., message 708) and/or other electronic documents. A draft of an electronic document can be associated with an account of a message management service or a messaging service. The information about a message or a draft can include all or some of a draft of a message (e.g., a preview of a draft). The information can indicate, if any, one or more senders of a message and/or one or more recipients of a message.

Interface 700 can present one or more interactive controls to enable a user to request a client to perform actions for a message, a draft, or other electronic document displayed in interface 700. An interface control can enable a user to move a draft or a message to a designated collection, e.g., by tapping a finger (or pointing and clicking with a mouse) on the control button that corresponds to the desired collection. Other control elements can also be provided, e.g., for replying to a message/draft, forwarding a message/draft, or composing a message/draft. In some embodiments, the information about a message or a draft can include one or more interactive controls. Interaction with an interactive control can cause an additional or a different interface to be displayed that presents information about the message or the draft, including the message or the draft, corresponding to the information associated with the interactive control. For example, interaction with a draft can cause a different interface to be presented that enables a user to edit a draft. In some embodiments, the information about a draft can be updated as a client receives an updated draft from a message management service.

In some embodiments, the information about a draft can indicate a value or other information indicating a version of a draft. For example, draft 706 can be displayed with value 702 (e.g., "11") indicating information associated with a draft or messages related to draft 706. Value 702 can indicate a version of draft 706. Value 702 can indicate a count of messages, a count of drafts, or a combination thereof. Value 702 can be displayed with a visual indicator that indicates a state of a draft/a message and/or a time period associated with a state of the draft/the message. The visual indication can indicate a state by an image, a color, an animation, a flashing image, other image, a value, or combinations thereof. In some embodiments, draft 710 can be displayed with visual indicator 704. Visual indicator 704 can indicate a status of a draft such as an indication that a draft has been composed, updated, deleted, sent, stored, or modified. Visual indicator 704 can indicate status by an image, a color, an animation, a flashing image, other image, a value, or combinations thereof.

Figure 8:
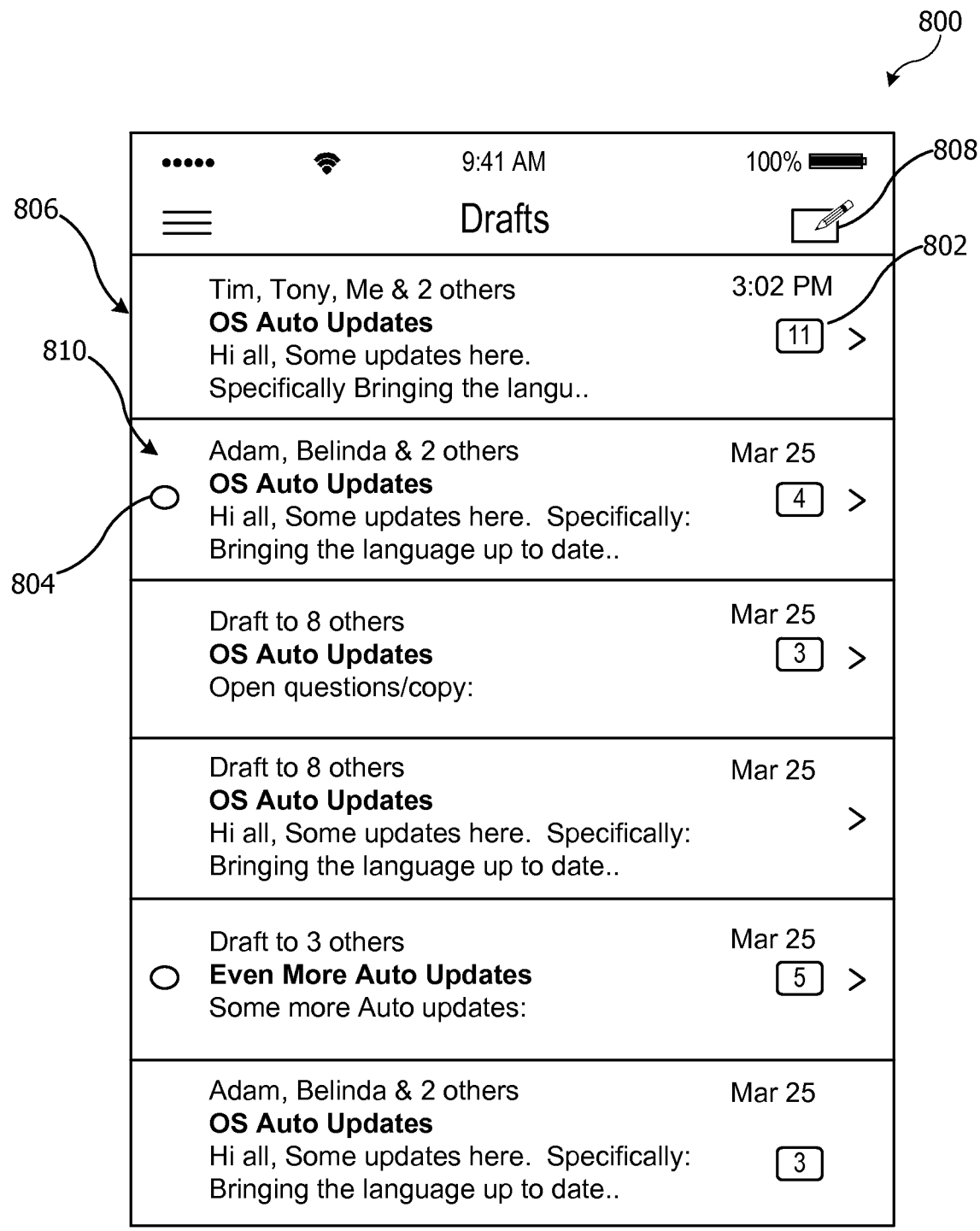

FIG. 8 shows interface 800 (e.g., a graphical user interface) that can be displayed on a client device (e.g., client 108 or client 110 of FIG. 1). The interface can present information about one or more drafts of electronic documents and/or messages (e.g., draft 806 or draft 810). A draft can be associated with an account of a message management service or a messaging service. The information about a draft can include all or some of a draft of a message (e.g., a preview of a draft). The information can indicate, if any, one or more senders of a message and/or one or more recipients of a message.

Interface 800 can include information about a draft that indicates a value (e.g., value 802) or other information indicating a version of a draft. For example, draft 806 can display value 802 (e.g., "11"). Value 802 can indicate information associated with a draft or messages related to the draft. Value 802 can indicate a version of draft 806. Value 802 can indicate a count of messages, a count of drafts, or a combination thereof. Value 802 can be displayed with a visual indicator that indicates a state of a draft/a message and/or a time period associated with a state of the draft/the message. The visual indication can indicate a state by an image, a color, an animation, a flashing image, other image, a value, or combinations thereof. Draft 810 can be displayed with a visual indicator 804, which can indicate a status of a draft such as when a draft has been composed, updated, deleted, sent, stored, or modified. The visual indicator can indicate status by an image, a color, an animation, a flashing image, other image, a value, or combinations thereof.

In some embodiments, interface 800 can include one or more interactive controls, e.g., control 808, that can receive input to enable a user to compose a draft. An additional interface can be presented in response to interacting with interactive control 808. The interface can enable a user to compose a draft of a message.

Figure 9:
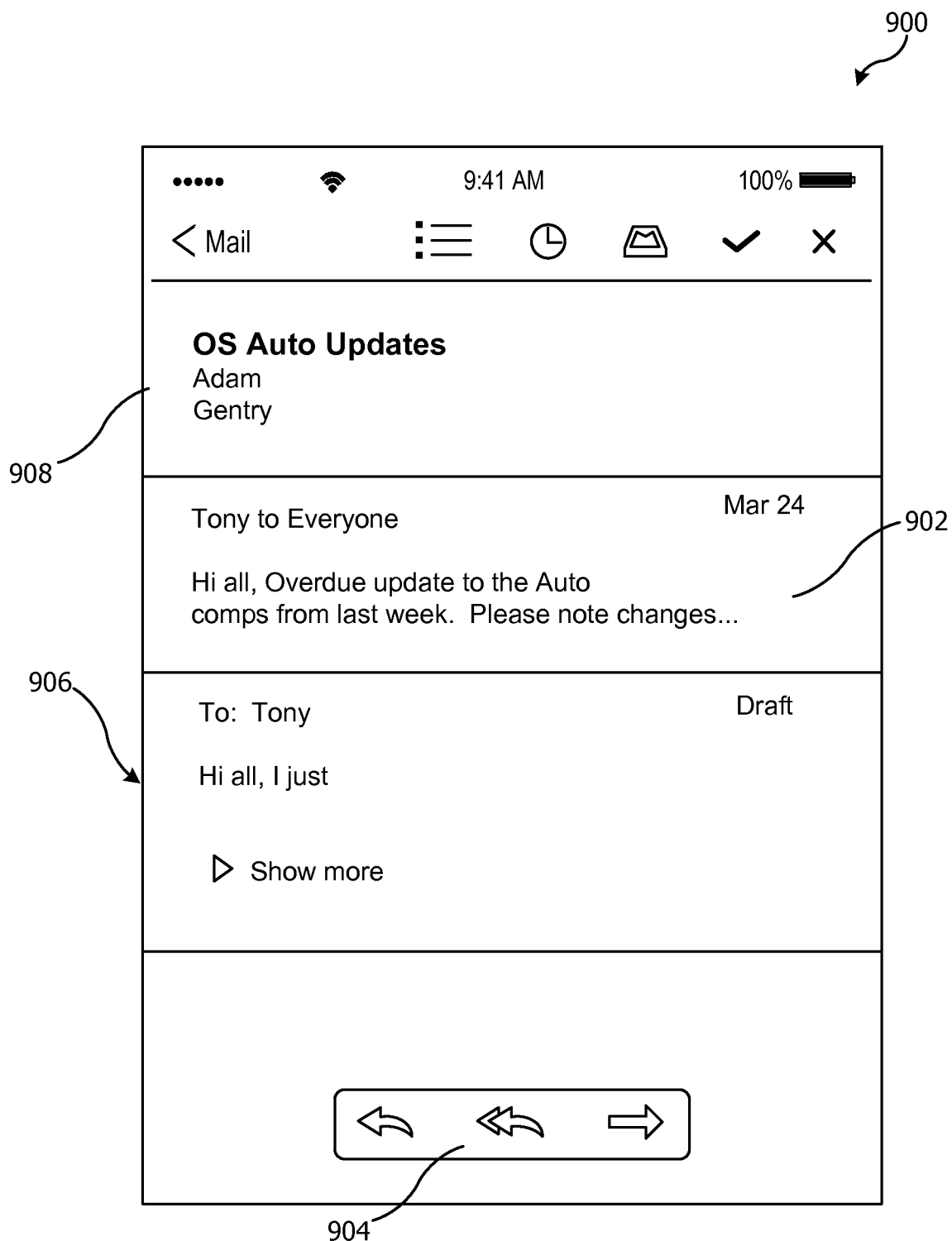
FIG. 9 shows an example of an interface for initiating composition of a draft of an electronic document according to an embodiment of the present invention.

FIG. 9 shows an example of interface 900 (e.g., a graphical user interface) that can be displayed on a client device (e.g., client 108 or client 110 of FIG. 1). The interface can present one or more interactive controls to compose an electronic document. In the example shown in FIG. 6, one or more interactive controls are presented that enable a user to compose a message (e.g., an email message).

Interface 900 can present information about one or more messages related to or from which a draft can be composed. For example, interface 900 can display information 908 from a message. Information 908 can indicate one or more senders of a message, one or more recipients of the message, message body 902, or combinations thereof.

Interface 900 can present information 906 for a draft that was previously composed. The information can include one or more senders of a message, one or more recipients of the message, a body of the message, or combinations thereof. Interface 900 can include one or more interactive controls to enable more details about a draft to be shown. Interface 900 can include one or more interactive elements that enable a user to interact with the draft to enable the draft to be composed, e.g., edited. One or more interactive controls 904 in interface 900 can enable a user to compose a new draft as a reply or a forwarded message to one or more recipients, such as one or more senders or recipients identified in a previous draft or message shown in interface 900. In some embodiments, interface 900 can be modified to enable a user to compose a new draft of an electronic document or to cause display of an additional interface to enable a user to compose a new draft of an electronic document.

Figure 10:
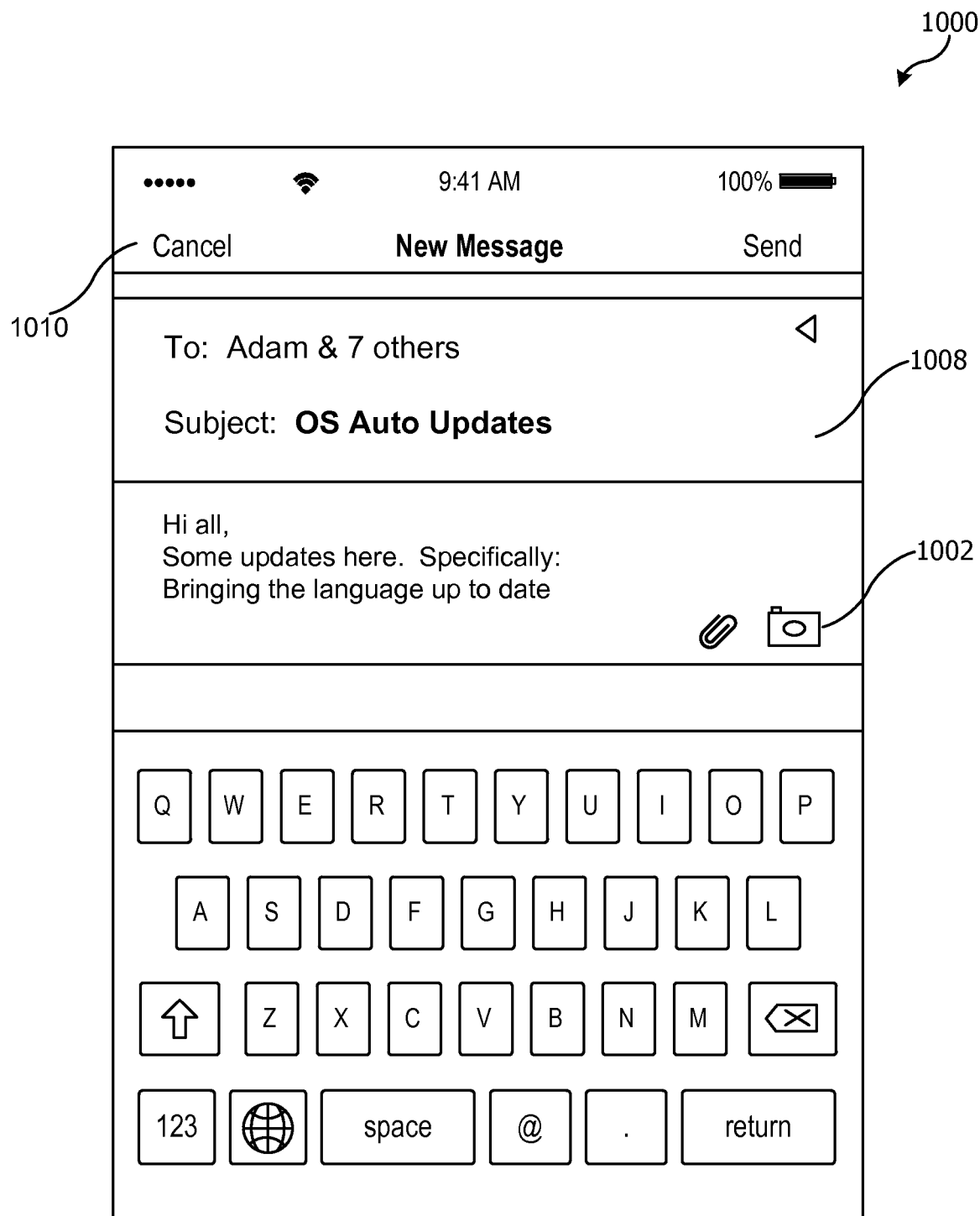
FIGS. 10 and 11 each show an example of an interface for composing a draft of an electronic document according to an embodiment of the present invention.
Figure 11:
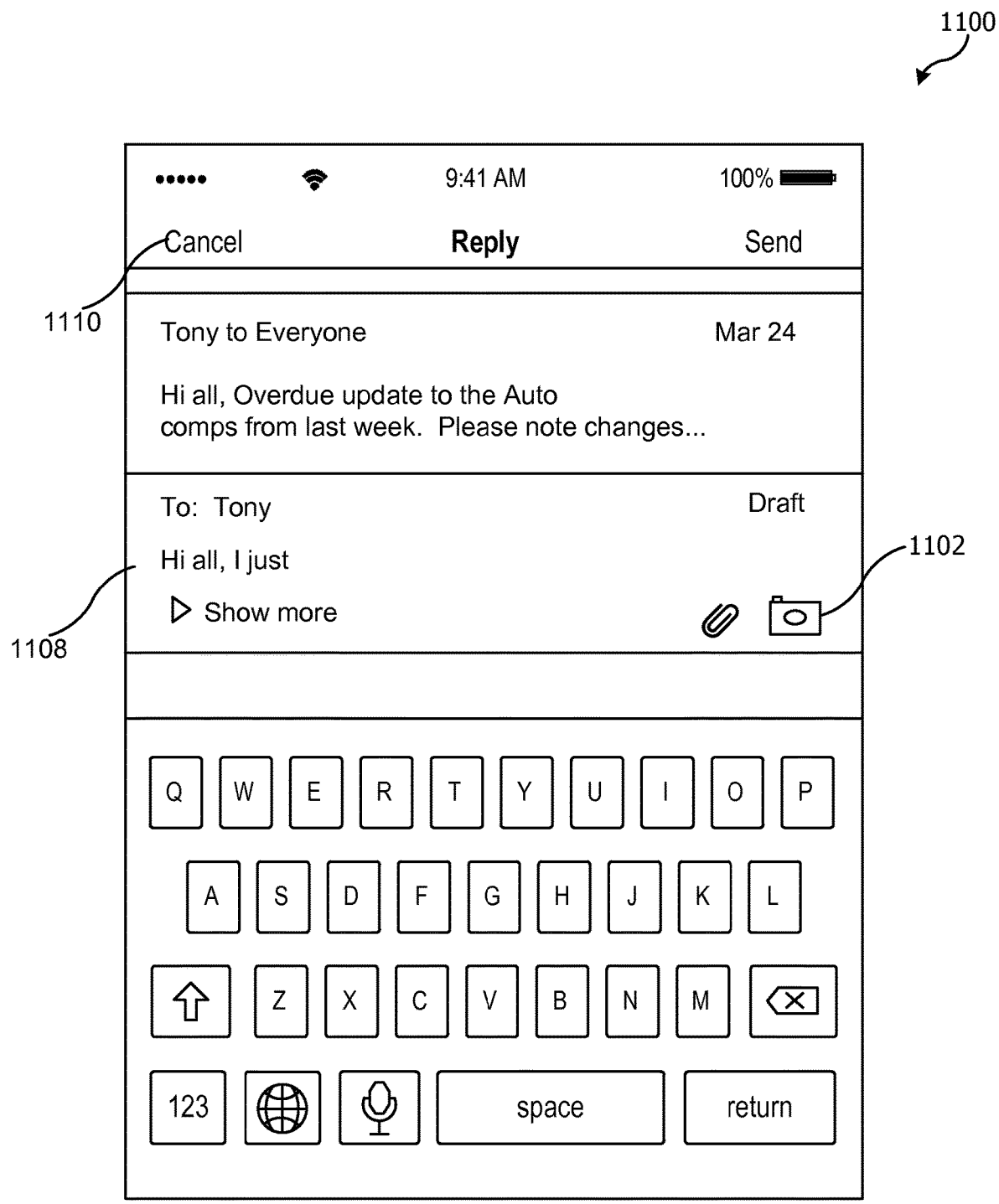
Figure 12:
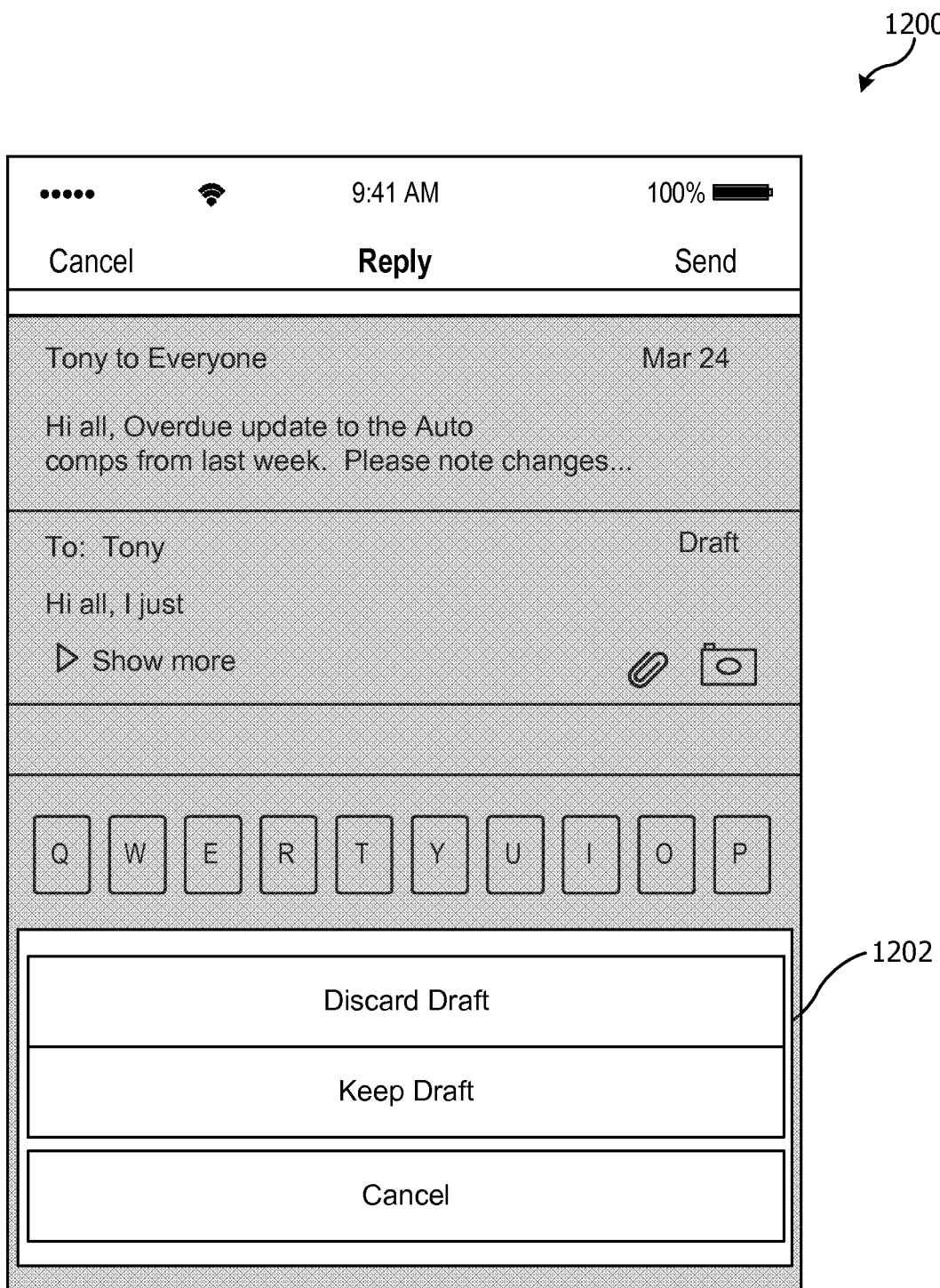
FIG. 12 shows an example of an interface for managing a draft of an electronic document according to an embodiment of the present invention.

FIGS. 10 and 11 show examples of interfaces for composing a draft of an electronic document according to an embodiment of the present invention. Interface 1000 (e.g., a graphical user interface) is shown in FIG. 10 to enable a user to compose a new draft. Interface 1100 (e.g., a graphical user interface) is shown in FIG. 11 to enable a user to compose a draft as a reply to a previous message. Interfaces 1000, 1100 can include an interactive control (e.g., interactive controls 1002, 1102) that enable a user to provide an attachment (e.g., a photo or a file) to be included or associated with a draft of an electronic document. Interfaces 1000, 1100 can include interactive areas 1008, 1108 that enable a user to specify input to compose an electronic document, such as a message. Interactive area 1008, 1108 can enable a user to specify one or more senders, one or more recipients, a subject, a body of a message, and/or other information to include in a draft of a message. Interfaces 1000, 1100 can include interactive control 1010, 1110 to cancel a draft of a message. In some embodiments, interaction with interactive control 1010, 1110 can cause another interface (e.g., interface shown in FIG. 12) that provides one or more interactive controls to enable a user to choose whether to cancel a draft or perform other options for managing the draft.

FIG. 12 shows an example of interface 1200 (e.g., a graphical user interface) for managing a draft according to an embodiment of the present invention. Interface 1200 provides an example of one or more interactive controls 1202 that can be displayed to a user. For example, interface 1200 can be presented to a user in response to interaction with interface 1000, 1100, such as with either of interactive controls 1010, 1110. In some embodiments, interface 1200 can include all or part of interface 1000 or interface 1100 based on the interactive control used to invoke interface 1200. In some embodiments, all or part of interface 1200 can include one or more interactive controls 1202 to enable a user to perform one or more actions for managing a draft. The action can include saving a draft, discarding a draft, continuing composition of a draft, or canceling a request to perform the action. In some embodiments, interactive control(s) 1202 can be presented as overlaid on interface 1200. All or part of interface 1200 can have a visual appearance (e.g., greyed-out) that is different from interactive control(s) 1202. The visual appearance can indicate that controls associated with interface 1200 are inactive. In some embodiments, interactive control(s) 1202 can be presented to a user when a device detects a conflict between a draft being composed, and a draft received from another computing device or computing system, e.g., message management service 200. Interactive control(s) 1202 can enable a user to save both conflicting drafts, discard the current draft being composed, discard the received draft, or ignore the conflict and continue composing the current draft.

Figure 13:
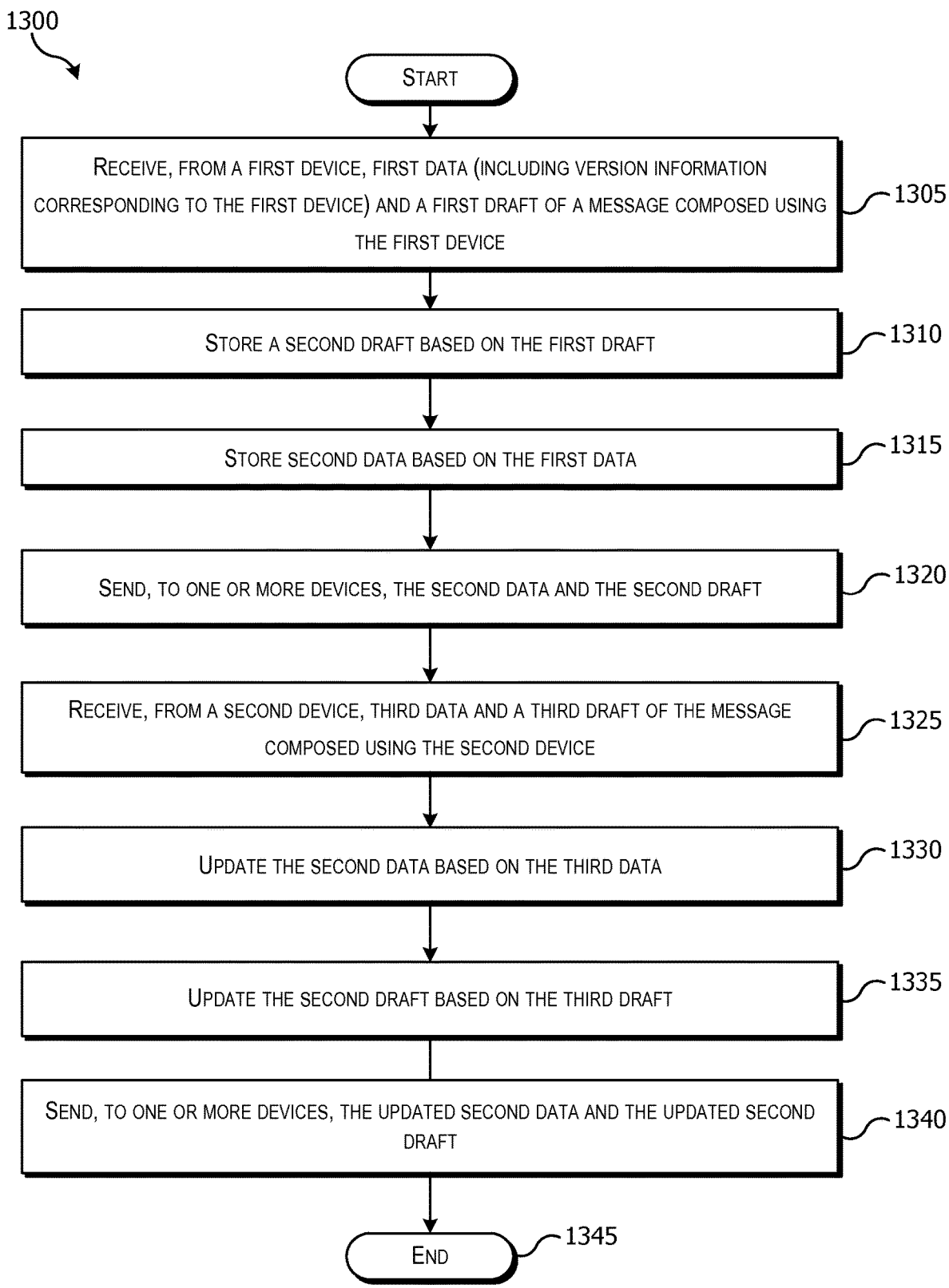
FIG. 13 is a flow diagram of a process for managing a draft of an electronic document according to an embodiment of the present invention.

FIG. 13 is a flow diagram of process 1300 for managing a draft of an electronic document according to an embodiment of the present invention. Process 1300 can be implemented by a message management service, such as message management service 200 of FIG. 2 or message management service 104 of FIG. 1. The examples described with reference to FIG. 13 illustrate some embodiments of techniques for storing a draft of a message composed using different devices and synchronizing the draft with multiple devices. A draft can be stored with version information about that draft received from a device that composes a draft. An update to a draft is distributed to devices with version information.

When a draft has been composed using multiple devices, the draft can be stored with version information indicating the version of the draft stored on each device. The version information can be useful to enable the device and/or the computing system implementing process 1300 to determine whether a draft of a message is composed using a current draft.

Process 1300 begins at block 1305 by receiving, from a device (e.g., a "first device" such as client 202), data (e.g., "first data") and a draft of a message (e.g., a "first draft") composed using the first device. For example, message management service 200 can receive from client 202 a draft of a message and data including version information corresponding to the draft. In some embodiments, a draft of a message can be an electronic document. The electronic document can include a body of a message and other information included in a message, such as a recipient of the message. When requested by a device, the electronic document can be included in a message sent to a recipient. The first data can include version information (e.g., draft version information 414) corresponding to the device. The version information can indicate a version associated with the draft of the message composed using the device. In some embodiments, data received from a device can be stored in a data structure (e.g., data structure 410). The data can include version information corresponding to one or more devices. The version information can indicate a version of associated with a draft of a message for each of the one or more devices. The version of the draft can correspond to a value that can be incremented corresponding to the draft of the message being composed.

At block 1310, process 1300 can store a draft of the message (e.g., a "second draft") based on the first draft. In some embodiments, the first draft of the message can be stored as the second draft of the message. For example, message management service 200 can store the first draft of the message as a second draft of the message in draft cache 230. The second draft of the message can correspond to most recent version of a draft of the message (e.g., "a current draft") received from a device that composed the most recent version of the draft. For example, the second draft of the message can correspond to the first draft composed by the first device.

At block 1315, process 1300 can store data (e.g., "second data," such as data stored according to data structure 450) based on the first data. For example, message management service 200 can store the data received from the device in draft cache 230. The data can be stored in draft cache 230 in a data structure, such as data structure 450. The data stored in draft cache 230 can include version information corresponding to the draft of the message (e.g., the second draft) received from the first device.

At block 1320, process 1300 can send the second data and the second draft to one or more devices, such as a "second" device. The devices (e.g., the second device) can be different from the device (e.g., the first device) from which the draft was received at block 1305. For example, message management service 200 can send the second data and the second draft to client 206. The second data and the second draft can be sent to devices so that those devices can be synchronized with the most recent version of the draft (e.g., the stored second draft). The second data can indicate version information corresponding to the current draft of the message. The second data can indicate a version of the draft stored by other devices that have received and/or composed a version of the draft.

At block 1325, process 1300 can receive, from the second device, data (e.g., "third data") and a draft of the message (e.g., a "third draft") composed using the second device. For example, message management service 200 can receive, from a device (e.g., client 206) a third draft of a message and third data corresponding to version information for the third draft. A third draft can be composed using the second device to modify the second draft. For example, the third draft can be an updated draft of the second draft corresponding to the current draft. The third data can be based on updating the second data to indicate a version associated with the third draft. For example, the second device can update a version of the draft based on composing the third draft.

At block 1330, process 1300 can update the second data based on the third data. For example, message management service 200 can update the data stored in data structure 450 with the version of the third draft indicated by the third data received from the second device. In doing so, the version information of the second draft can be maintained as the current version of the current draft of the message.

At block 1335, process 1300 can update the second draft based on the third draft. For example, message management service can update the second draft stored in data structure 430 based on the third draft received from the second device. By updating the second draft stored in data structure 430, the second draft can be maintained as the current draft of the message.

At block 1340, process 1300 can send, to one or more devices (e.g., the first device and/or the second device), the updated second data and the updated second draft. As explained above, the second draft can correspond to a current draft of a message. The second draft when updated can be distributed to devices (e.g., client 202 or client 206) to keep the devices synchronized with a current version of the draft of a message. In the example above, message management service 200 can send the updated second draft can be sent along with the updated second data to devices so that those devices can be informed about the version corresponding to the updated second draft. The devices can use the version information to determine whether to update the draft stored locally on the device. Process 1300 can end at block 1345.

It will be appreciated that process 1300 is illustrative and that variations and modifications are possible. Steps described as sequential can be executed in parallel, order of steps can be varied, and steps can be modified, combined, added or omitted. For instance, block 1310 and block 1315 can be performed in any order. In another instance block 1330 and block 1335 can be performed in any order. A draft of a message and corresponding data for the draft can be received from a device in an order other than the order described above. More or fewer drafts can be received from one or more devices. Accordingly, the second draft and the second data can be updated based on the draft and the corresponding data that is received from a device. The second draft and the corresponding second data can be sent to one or more devices after being updated so that devices (e.g., a client) can be updated with a current version of a draft.

Figure 14:
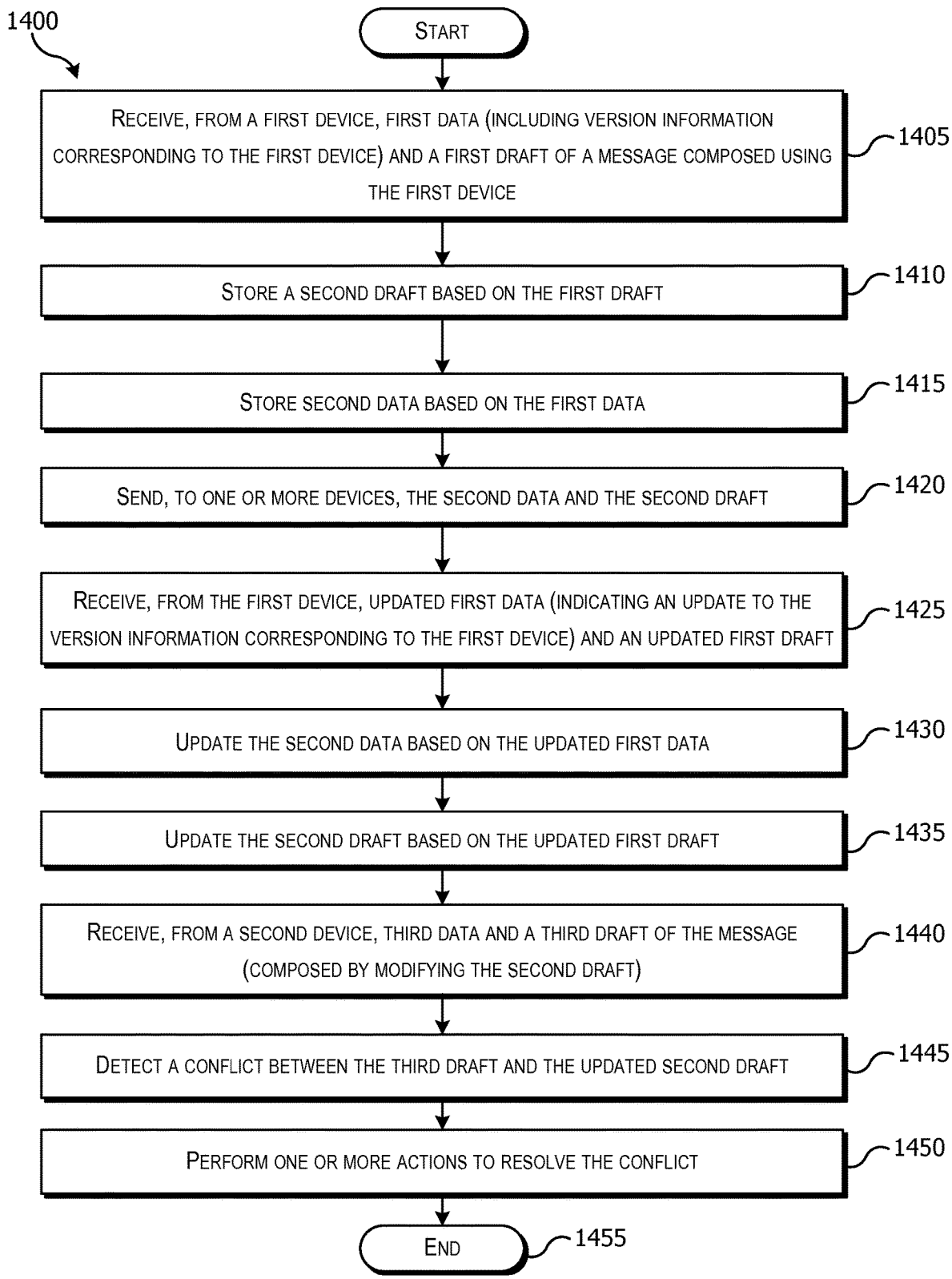
FIG. 14 is a flow diagram of a process for managing a draft of an electronic document according to an embodiment of the present invention.

FIG. 14 is a flow diagram of process 1400 for managing a draft of an electronic document according to an embodiment of the present invention. Process 1400 can be implemented by a message management service, such as message management service 200 of FIG. 2 or message management service 104 of FIG. 1.

The examples described with reference to FIG. 14 illustrate some embodiments of techniques for storing a draft of a message and corresponding version information of the draft to enable detection of a conflict between drafts of a message composed using different devices. Process 1400 can include storing version information indicating a version of a draft stored by each device having a draft of the message. The version information can be sent to devices along with a current draft of a message. A device that composes (e.g., edits) a draft based on the current draft can send the version information along with the revised draft. The version information corresponding to the device that edits a draft can be updated. Process 1400 can compare the version information received from a device with a draft to the version information stored in local storage by process 1400 to determine whether the draft edited by the device was based on the current draft stored in local storage by the process 1400. A conflict can be identified when the version information received from a device does not match the version information stored in local storage. A conflict can occur for many reasons, such as when a device updates a version of a draft that is not current because the device was unable to receive a current version of a draft. Detecting a conflict can be useful to enable a computing system to resolve the conflict in a manner that reduces the inconvenience to a user trying to edit a draft of a message using different devices. In some embodiments, a user can be presented with an option to choose one of the conflicting drafts to use going forward as a current draft.

Process 1400 begins at block 1405 by receiving, from a device (e.g., a "first device" such as client 202), data (e.g., "first data") and a draft of a message (e.g., a "first draft") composed using the first device. In some embodiments, a draft of a message can be an electronic document. The first data can include version information (e.g., draft version information 414) corresponding to the device. The version information can indicate a version associated with the draft of the message composed using the device. In some embodiments, data received from a device can be stored in a data structure (e.g., data structure 410). The data can include version information corresponding to one or more devices. The version information can indicate a version of associated with a draft of a message for each of the one or more devices. The version of the draft can correspond to a value that can be incremented corresponding to the draft of the message being composed.

At block 1410, process 1400 can store a draft of the message (e.g., a "second draft") based on the first draft. In some embodiments, the first draft of the message can be stored as the second draft of the message. The second draft of the message can correspond to a current draft of the message. In this example, the current draft corresponds to the first draft that is stored as the second draft.

At block 1415, process 1400 can store data (e.g., "second data," such as data stored according to data structure 450) based on the first data. The data can be stored in draft cache 230 in a data structure, such as data structure 450. The data stored in draft cache 230 can include version information corresponding to the draft of the message (e.g., the second draft) received from the first device.

At block 1420, process 1400 can send the second data and the second draft to one or more devices, such as a "second" device. The devices (e.g., the second device) can be difference from the device (e.g., the first device) from which the draft was received at block 1405. The second data and the second draft can be sent to devices so that those devices can be synchronized with the most recent version of the draft (e.g., the stored second draft). The second data can indicate version information corresponding to the current draft of the message. The second data can indicate a version of the draft stored by other devices that have received and/or composed a version of the draft.

At block 1425, process 1400 can receive, from a device (e.g., the first device), updated data and an updated draft. For example, an updated draft can be received from a device that previously sent a draft, such as the first device. Such a device can send an updated draft of a message and updated data that indicates a version of the updated draft. In some embodiments, an updated draft and updated data can be received from different devices before a current version of a draft is distributed to those devices. As such, the updated draft and the updated data received from a device can be based on a version of the draft and the data indicating the version, both of which can be stored locally by the device.

At block 1430, process 1400 can update the data (e.g., the second data) based on the updated data (e.g., the updated first data) received from a device with an updated draft. The data stored in local storage that indicates a current version of the draft stored in local storage can be updated with the updated data received with an updated draft. By doing so, process 1400 maintains a current version of a draft (e.g., the second draft) stored in local storage.

At block 1435, process 1400 can update the stored draft (e.g., the second draft) based on the updated draft received from the device at block 1425. The stored draft can be updated in local storage to maintain a current version of the draft corresponding to the version indicated by the updated first data.

At block 1440, process 1400 can receive, from a device (e.g., the second device), data (e.g., "third data") and a draft of the message (e.g., a "third draft") composed using the second device. The third data can indicate a version associated with the third draft of the message. The third draft can be composed by modifying the second draft at the second device. For example, the third draft can be an updated draft of the second draft corresponding to the current draft. The third data can be based on updating the second data to indicate a version associated with the third draft. In some examples, such as those described with reference with FIG. 14, the second device can compose the third draft based on the second draft (e.g., received at block 1420) because the second device may not have received the second draft updated at block 1435. The second device may not have received the updated second draft because of connectivity issues between the second device and a computer system that implements process 1400 or other issues that can prevent second device from receiving the updated second draft. As such, the second device can enable a user to compose the third draft based on the second draft stored by the second device.

At block 1445, process 1400 can detect a conflict between the draft (e.g., the third draft) and a draft (e.g., the updated second draft) stored in local storage by a computer system that implements process 1400. A conflict can be detected by comparing the third data to the updated second data. In some embodiments, data corresponding to a draft can include version information indicating a version of a draft stored by each device that has a draft of a message. The version information included in the data (e.g., the third data) received with a draft of a message from a device can be compared to the data (e.g., updated second data), which is stored locally by a message management service. Except for the version of the draft received at block 1440, a data can be compared to detect a conflict by comparing a version of the draft stored by each device to the version of the draft stored by each device indicated by data received from the message management service. In some embodiments, a version that does not match for a draft stored on a device can indicate that another device updated the draft. For example, a conflict can arise between the third draft and the updated second draft because a version of the draft of the message indicated by the third data and the updated second data may not be identical. In this example, the version of the draft indicated by the third data can be based on the second data, not the updated second data. The version of the draft on the first device has changed based on the updated second draft. When such a difference is determined, a conflict can be detected because the third data indicates that a version of a draft stored by one device does not match the version of the draft stored by a device from which the third data was received.

At block 1450, process 1400 can perform one or more actions to resolve the detected conflict. One action can include sending a message (e.g., a notification) indicating the detected conflict. The message can be sent to a messaging account (e.g., an email account) via a messaging service. In some embodiments, such a message about the detected conflict can be sent such that one or more devices, e.g., each device storing a draft of the message for which a conflict was detected, can receive the message. The message about the detected conflict can include the drafts for which a conflict was detected. In some embodiments, the message can cause a device to display an interface that enables a user to choose one or more options for resolving the conflict. The option can be displayed with an identifier associated with each conflicting draft or the drafts themselves. The option(s) for resolving the conflict can include choosing one of the conflicting drafts. Another action can include choosing one of the conflicting drafts. A conflicting draft can be chosen based on a date of each draft. In some embodiments, a conflict can be resolved based on one or more preferences indicated by an account associated with the device that stores one of the conflicting drafts. Another action can include storing both conflicting drafts and updating the second data to indicate the conflict. The second data when sent to a device can be used by the device to inform a user of the conflict. Process 1400 can end at block 1455.

It will be appreciated that process 1400 is illustrative and that variations and modifications are possible. Steps described as sequential can be executed in parallel, order of steps can be varied, and steps can be modified, combined, added or omitted. For instance, block 1410 and block 1415 can be performed in any order. In another instance block 1430 and block 1435 can be performed in any order. A draft of a message and corresponding data for the draft can be received from a device in an order other than the order described above. More or fewer drafts can be received from one or more devices.

Figure 15:
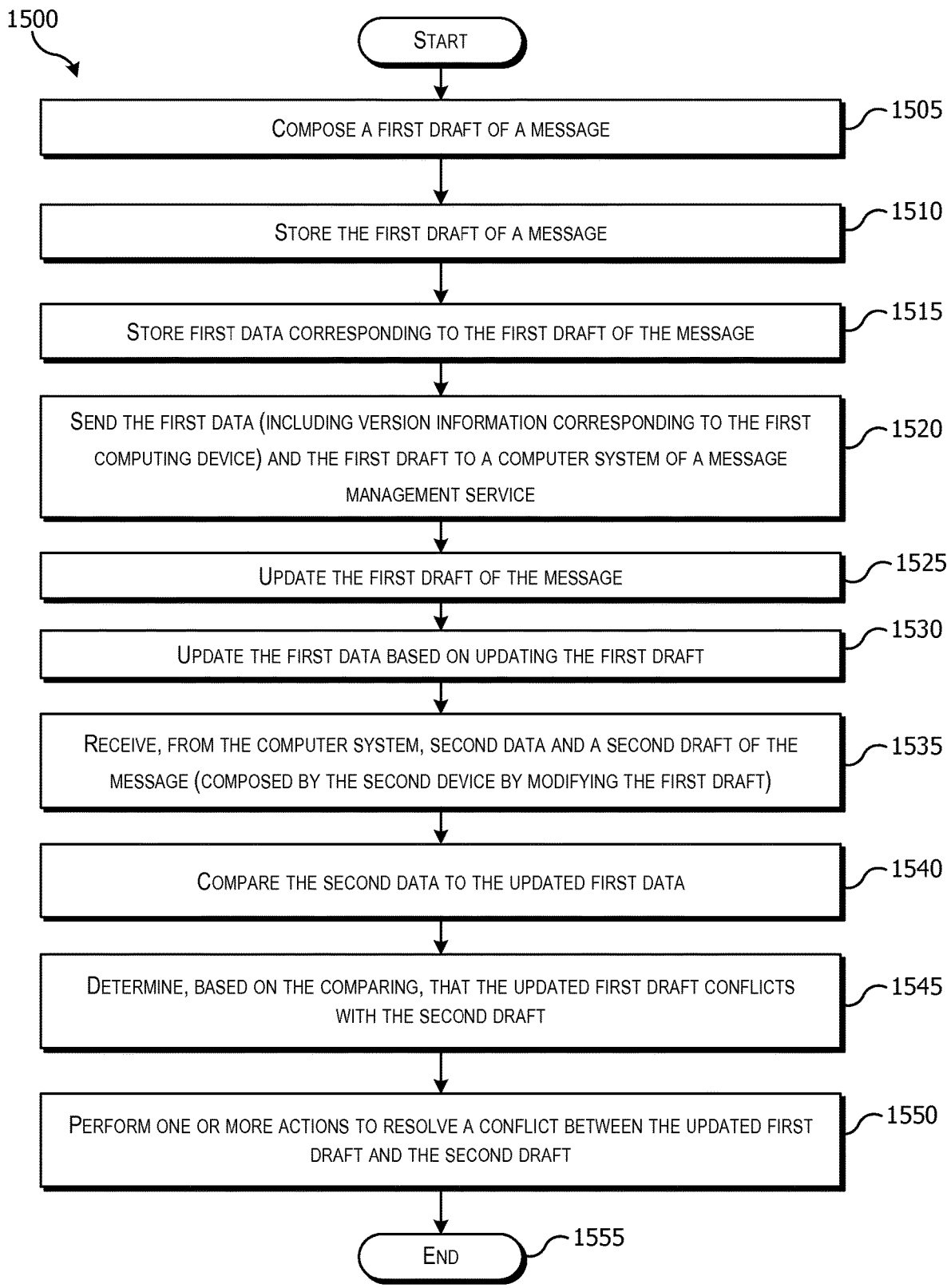
FIG. 15 is a flow diagram of a process for managing a draft of an electronic document according to an embodiment of the present invention.

FIG. 15 is a flow diagram of process 1500 for managing a draft of an electronic document according to an embodiment of the present invention. Process 1500 can be implemented by a client, such as client 108 or client 110 of FIG. 1 and/or client 202 or client 206 of FIG. 2.

The examples described with reference to FIG. 15 illustrate some embodiments of techniques for a client (e.g., a client device) to manage storing a draft of an electronic document (e.g., a draft of a message) on a device. A client can store data including version information that indicates a version of the draft stored by the client. The version information can be used by the client to determine whether to update a draft of an electronic document based on an updated draft of the electronic document. In some embodiments, the client can determine whether an updated draft conflicts with a draft stored locally by the client. The determination of a conflict can be performed using the version information. By doing so, the client can determine whether the version of the draft stored locally was updated by another client before that draft was updated by the client. In some embodiments, the client can receive, from another computing device, an update to the version of the draft stored locally by the client. The update can be received from a message management service (e.g., message management service 200) or another client. The client receiving the update can store the update to the version of the draft.

Process 1500 can begin at block 1505 by composing a draft (e.g., a "first draft") of a message. For example, client 202 can present an interface that enables a user to compose a draft of a message. Based on input received using the interface, a draft of a message can be composed.

At block 1510, process 1500 can store the first draft of the message composed. At block 1515, process 1500 can store first data corresponding to the first draft of the message. The first draft and the first data can be stored at the client that implements process 1500. The first draft can indicate a version corresponding to a draft of a message. Storing the first data can include updating version information indicating a version corresponding to a draft of a message that is composed by process 1500. In some embodiments, the first data can be stored in a data structure (e.g., data structure 410). The version of the draft can correspond to a value that can be incremented corresponding to a draft of the message that is composed.

At block 1520, process 1500 can send, to a computer system of a message management service (e.g., message management service 200), a draft (e.g., the first draft) of a message composed by process 1500 and the data including version information corresponding to the draft.

A draft of a message and the version information can be sent to a message management service to enable the message management service to manage a current version of the draft composed by one or more clients.

At block 1525, process 1500 can update the draft (e.g., the first draft) of the message previously stored by process 1500. The draft of the message can be updated by a client based on composing (e.g., editing) the draft of the message stored by the client. At block 1530, process 1500 can update the data (e.g., the first data) previously stored by process 1500. The data can be updated based on updating the draft of a message. The data can be updated to indicate a version (e.g., increment a value indicating a version) of the updated draft.

At block 1535, process 1500 can receive, from a computer system (e.g. a computer system of a message management service), data (e.g., "second data") and a draft (e.g., a "second draft") of the message. The draft of the message can correspond to a draft of the message stored by the computer system. The draft stored by the computer system could have been received from a client that composed the draft. In some embodiments, the draft can be composed by a client other than a client that implements process 1500. The second data received from the computer system can include version information indicating a version associated with the second draft. The version information can indicate a version of the draft stored by each client device that has stored a version of the draft. The version information can be used to determine whether an update to the draft by process 1500 is based on a current version of the draft.

At block 1540, process 1500 can compare the data received from the computer system (e.g., the second data) to the updated first data at block 1530. For example, the version information in the updated first data can be compared to the version information indicated by the second data received from the computer system. In some embodiments, version information corresponding to a draft of an electronic document can indicate a version of the draft stored by each client that stores a version of the draft. As such, the version information corresponding to the version of the draft stored by each device can be compared for the comparison between the updated first data and the second data. The comparison can enable a determination to be made as to whether a draft stored by other clients has been updated based on a different version of the draft stored by a client implementing process 1500.

At block 1545, process 1500 can determine that the updated draft (e.g., the first draft) stored by process 1500 conflicts with the second draft. A conflict can be determined when the version information in the second data does not match (e.g., is not equal to) the first data stored for the updated draft. In some embodiments, a conflict can be determined based on whether the version information indicated by the second data (e.g., version information of draft stored by other clients) does not match the version information stored in the first data. The comparison performed at block 1540 can indicate that a version of the draft stored by another client can have been updated and as such, does not correspond to the same version indicated by the first data. In some embodiments, when the version information for a draft stored by one client does not match version information for that draft indicated by the first data, a conflict can be detected.

At block 1550, process 1500 can perform one or more actions to resolve a conflict between the updated first draft and the second draft. One action can include displaying an interface that prompts a user to resolve the conflict by choosing between the updated first draft and the second draft. Another action can include choosing between the updated first draft and the second draft. An action can include presenting an interface, sending a notification to a client device, and/or sending a message, via a messaging service, to a messaging account to indicate that a conflict has been detected. In some embodiments, an action can include storing both of the conflicting drafts. A client can present both stored drafts to the user for viewing. In some embodiments, an action can include storing a draft chosen to resolve the conflict and data indicating a version of the draft based on the draft chosen. For example, the first draft can be updated with the draft (e.g., the updated first draft or the second draft) chosen to resolve the conflict. The first data can be updated to indicate the version information corresponding to the draft (e.g., the updated first draft or the second draft) chosen for resolution of the conflict. In some embodiments, upon resolution of a conflict, the updated first data and the updated first draft updated to resolve the conflict can be sent to a computer system of a message management service. Such information can be stored by the computer system of the message management service and/or can be synchronized with other clients so that they are updated with a current version of the draft (e.g., the updated first draft). Process 1500 can end at block 1555.

It will be appreciated that processes 1300, 1400, and 1500 are illustrative and that variations and modifications are possible. Steps described as sequential can be executed in parallel, order of steps can be varied, and steps can be modified, combined, added or omitted. The processes can be performed by various computer systems, including a client computer system, a server computer system of a message management service, a server computer system of a messaging service, and/or a server computer system of an online content management service. In some embodiments, different portions of the processes can be performed by different computer systems. For example, a standalone client implementation is possible where the client manages drafts of electronic documents and performs the operations described herein; such a client can communicate with a messaging service to send a draft of electronic document as a message. Alternatively, a message management service (or a messaging service) can implement processing operations such as sending a current version of a draft of an electronic document to clients, receiving new or updated version of a draft of an electronic document from clients, storing a draft of an electronic document that corresponds to a current version, and/or detecting conflicts between updates to a draft of an electronic document received from different clients. A client can present drafts of electronic documents to a user based on instructions from the message management service and provide instructions based on user input to the message management service. Other combinations and distributions of processing operations between different computer systems are also possible.

While the invention has been described with respect to specific embodiments, one skilled in the art will recognize that numerous modifications are possible. For example, while the description above can make reference to email, the invention can be applied to any type of electronic message that can be stored and managed.

Figure 16:
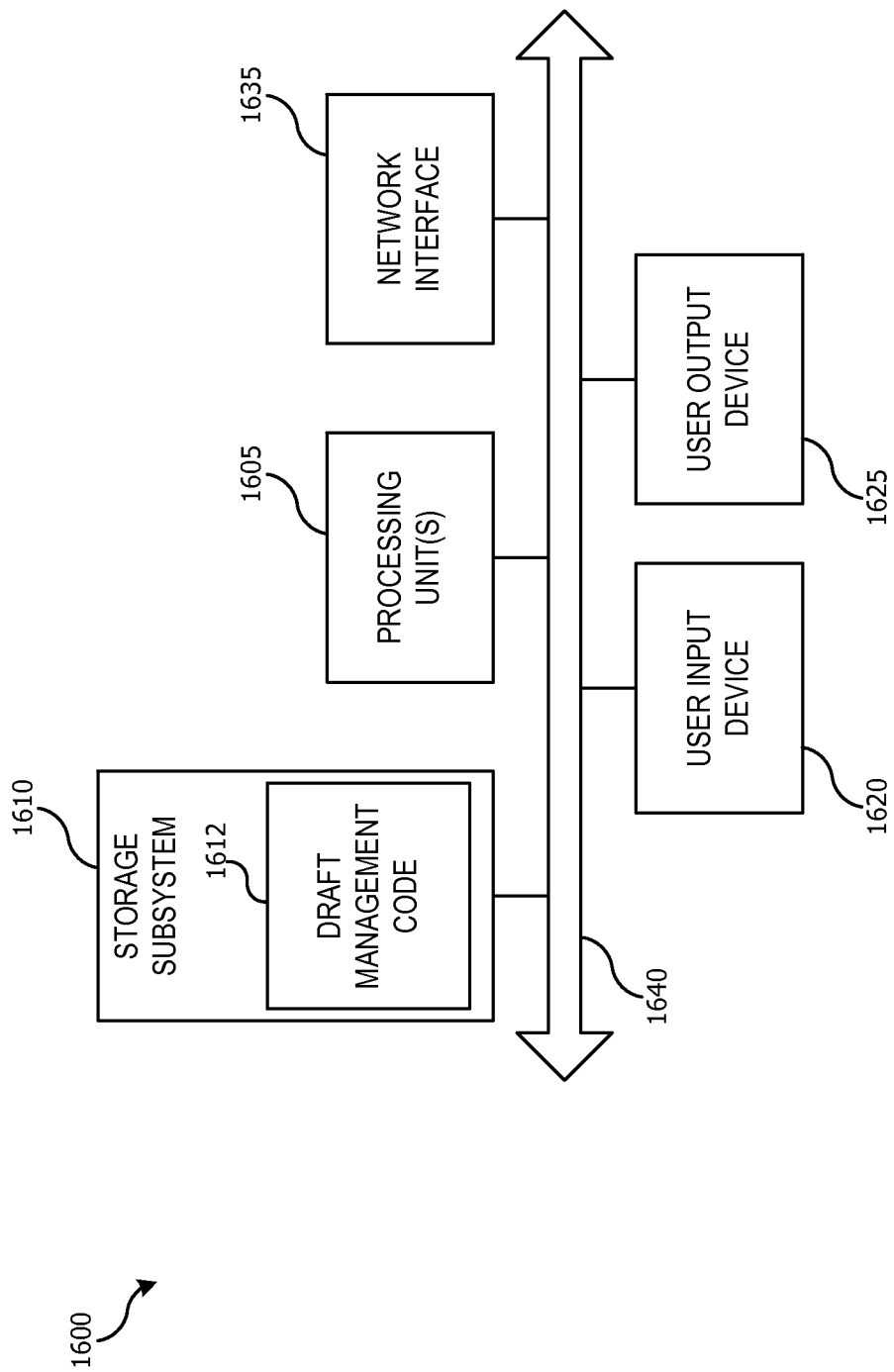
FIG. 16 shows a simplified block diagram of a representative computer system that can be used in an embodiment of the present invention.

Various operations described herein can be implemented on computer systems, which can include systems of generally conventional design. FIG. 16 shows a simplified block diagram of a representative computer system 1600. In various embodiments, computer system 1600 or similar systems can implement a user device (e.g., any of clients 108, 110 of FIG. 1) and/or a server system (e.g., servers implementing all or part of messaging service 102, message management service 104, or online content management service 130 of FIG. 1). Computer system 1600 can include processing unit(s) 1605, storage subsystem 1610, input devices 1620, output devices 1625, network interface 1635, and bus 1640.

Processing unit(s) 1605 can include a single processor, which can have one or more cores, or multiple processors. In some embodiments, processing unit(s) 1605 can include a general-purpose primary processor as well as one or more special-purpose co-processors such as graphics processors, digital signal processors, or the like. In some embodiments, some or all processing units 1605 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1605 can execute instructions stored in storage subsystem 1610.

Storage subsystem 1610 can include various memory units such as a system memory, a read-only memory (ROM), and a permanent storage device. The ROM can store static data and instructions that are needed by processing unit(s) 1605 and other modules of computer system 1600. The permanent storage device can be a read-and-write memory device. This permanent storage device can be a non-volatile memory unit that stores instructions and data even when computer system 1600 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 1605 need at runtime.

Storage subsystem 1610 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1610 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 1610 can store one or more software programs to be executed by processing unit(s) 1605, such as an operating system, a messaging client application, draft management code 1612, and so on. For example, where computer system 1600 implements message management service 200 of FIG. 2, draft management code 1612 can implement operations or methods described herein as performed by message management service 200. Where computer system 1600 implements client 102 (or other clients) of FIG. 1, draft management code 1612 can implement operations or methods described herein as performed by a client. "Software" refers generally to sequences of instructions that, when executed by processing unit(s) 1605, cause computer system 1600 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 1605. Software can be implemented as a single program or a collection of separate programs or program modules that interact as desired. From storage subsystem 1610, processing unit(s) 1605 can retrieve program instructions to execute and data to process in order to execute various operations described herein.

A user interface can be provided by one or more user input devices 1620 and one or more user output devices 1625. Input devices 1620 can include any device via which a user can provide signals to computer system 1600; computer system 1600 can interpret the signals as indicative of particular user requests or information. In various embodiments, input devices 1620 can include any or all of a keyboard, track pad, touch screen, mouse or other pointing device, scroll wheel, click wheel, dial, button, switch, keypad, microphone, and so on.

User output devices 1625 can include any device via which computer system 1600 can provide information to a user. For example, user output devices 1625 can include a display to display images generated by computer system 1600. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1625 can be provided in addition to or instead of a display. Examples include indicator lights, speakers, tactile "display" devices, printers, and so on.

In some embodiments, input device 1620 and output devices 1625 can interoperate to provide a graphical user interface ("GUI") that allows a user to interact with computer system 1600 by using an input device to select a control element displayed on the screen (e.g., by operating a pointing device such as a mouse or touching the location where a control element is displayed on a touch screen).

Network interface 1635 can provide voice and/or data communication capability for computer system 1600, including the ability to communicate with various messaging services and/or message management services to access and act upon messages. In some embodiments, network interface 1635 can include radio frequency (RF) transceiver components for accessing wireless voice and/or data networks (e.g., using cellular telephone technology, advanced data network technology such as 3G, 4G or EDGE, Wi-Fi (IEEE 802.11 family standards), or other mobile communication technologies, or any combination thereof), GPS receiver components, and/or other components. In some embodiments, network interface 1635 can provide wired network connectivity (e.g., Ethernet) in addition to or instead of a wireless interface. Network interface 1635 can be implemented using a combination of hardware (e.g., antennas, modulators/demodulators, encoders/decoders, and other analog and/or digital signal processing circuits) and software components.

Bus 1640 can include various system, peripheral, and chipset buses that communicatively connect the numerous components of computer system 1600. For example, bus 1640 can communicatively couple processing unit(s) 1605 with storage subsystem 1610. Storage subsystem 1610 can include draft management code 1612 that is configured to cause processing unit(s) 1605 to manage drafts of electronic documents as described herein. Bus 1640 can also connect to input devices 1620 and output devices 1625. Bus 1640 can also couple computing system 1600 to a network through network interface 1635. In this manner, computer system 1600 can be a part of a network of multiple computer systems (e.g., a local area network (LAN), a wide area network (WAN), an intranet, or a network of networks, such as the Internet. In some embodiments, bus 1640 and network interface 1635 can operate to connect any number of computers together to provide large-scale computing capacity (e.g., server farms) that can communicate with clients through a WAN interface (which can be part of network interface 1635).

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 1605 can provide various functionality for computer system 1600. For example, processing unit(s) 1605 can execute draft management code 1612. For example, where computer system 1600 implements a client device, processing unit(s) 1605 can execute a messaging client app that provides an interface operable by the user to interact with messages, including, e.g., any or all of the interface screens described above. Where computer system 1600 implements a server (e.g., part or all of message management service 104, online content management service 130, or messaging service 102 of FIG. 1), processing unit(s) 1605 can execute server applications that receive and respond to client requests and perform other operations described herein as being performable by a server or service.

It will be appreciated that computer system 1600 is illustrative and that variations and modifications are possible. Computer system 1600 can have other capabilities not specifically described here (e.g., mobile phone, global positioning system (GPS), power management, one or more cameras, various connection ports for connecting external devices or accessories, etc.). Further, while computer system 1600 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
presenting, by a client device, a first user interface that enables a user to compose a draft of a content item;
receiving, by the client device, via the first user interface, a first draft of the content item;
storing, by the client device, the first draft of the content item and first data structure corresponding to the content item, wherein the first data structure includes first version information, and wherein the first data structure is maintained and updated at the client device;
sending, by the client device, the first draft and the first data structure to a content management system;
detecting, by the client device, an update to the first draft of the content item;
based on the detecting, updating, by the client device, the first data structure to indicate a new version of the content item;
receiving, by the client device from the content management system, a second draft of the content item and a second data structure corresponding to the second draft of the content item, wherein the second data structure includes second version information associated with the second draft of the content item, wherein the second data structure is maintained and updated at the content management system;
comparing, by the client device, the second data structure to the updated first data structure to determine whether the second draft was updated based on a different version of the first draft stored by the client device;
determining, by the client device, that the updated first draft conflicts with the second draft based on a comparison between the updated first data structure and the second data structure; and
based on the determining, presenting, by the client device, a second user interface that prompts the user to resolve the conflict.

2. The method of claim 1, wherein the first data structure and the second data structure comprise version information indicating a version associated with a draft of the content item and wherein the version of the draft of the content item corresponds to a value, the value being adjusted based on composing the draft of the content item.

3. The method of claim 1, wherein storing, by the client device, the first draft of the content item and the first data structure corresponding to the content item comprises:
updating the first version information indicating a version corresponding to the first draft of the content item.

4. The method of claim 1, wherein comparing, by the client device, the second data structure to the updated first data structure comprises:
comparing version information corresponding to the second data structure to version information corresponding to the updated first data structure.

5. The method of claim 4, wherein determining, by the client device, that the updated first draft conflicts with the second draft based on a comparison between the updated first data structure and the second data structure, comprises:
determining that the version information corresponding to the second data structure does not match the version information corresponding to the updated first data structure.

6. The method of claim 1, wherein presenting, by the client device, the second user interface that prompts the user to resolve the conflict comprises:
prompting the user to choose between the updated first draft and the second draft.

7. The method of claim 6, further comprising:
determining, by the client device, that the user chose the updated first draft; and
sending, by the client device to the content management system, the updated first draft and the updated first data structure.

8. A non-transitory computer readable medium comprising one or more sequences of instructions, which, when executed by one or more processors, cause the one or more processors to perform operations, comprising:
presenting, by a client device, a first user interface that enables a user to compose a draft of a content item;
receiving, by the client device, via the first user interface, a first draft of the content item;
storing, by the client device, the first draft of the content item and first data structure corresponding to the content item, wherein the first data structure includes first version information, and wherein the first data structure is maintained and updated at the client device;
sending, by the client device, the first draft and the first data structure to a content management system;
detecting, by the client device, an update to the first draft of the content item;
based on the detecting, updating, by the client device, the first data structure to indicate a new version of the content item;
receiving, by the client device from the content management system, a second draft of the content item and a second data structure corresponding to the second draft of the content item, wherein the second data structure includes second version information associated with the second draft of the content item, wherein the second data structure is maintained and updated at the content management system;
comparing, by the client device, the second data structure to the updated first data structure to determine whether the second draft was updated based on a different version of the first draft stored by the client device;
determining, by the client device, that the updated first draft does not conflict with the second draft based on a comparison between the updated first data structure and the second data structure;
based on the determining, updating the updated first data structure to reflect the second version information by incrementing current version information associated with the updated first data structure to generate a current data structure; and
updating, by the client device, the updated first draft of the content item based on the second draft to generate a current draft of the content item.

9. The non-transitory computer readable medium of claim 8, wherein the first data structure and the second data structure comprise version information indicating a version associated with a draft of the content item and wherein the version of the draft of the content item corresponds to a value, the value being adjusted based on composing the draft of the content item.

10. The non-transitory computer readable medium of claim 8, wherein storing, by the client device, the first draft of the content item and the first data structure corresponding to the content item comprises:
updating the first version information indicating a version corresponding to the first draft of the content item.

11. The non-transitory computer readable medium of claim 8, wherein comparing, by the client device, the second data structure to the updated first data structure comprises:

comparing version information corresponding to the second data structure to version information corresponding to the updated first data structure.

12. The non-transitory computer readable medium of claim 8, further comprising:

receiving, by the client device from the content management system, a third draft of the content item and a third data structure corresponding to the third draft of the content item, wherein the third data structure includes third version information associated with the third draft of the content item;

comparing, by the client device, the current data structure to the third data structure to determine whether the third draft was updated based on a different version of the current draft stored by the client device;

determining, by the client device, that the current draft conflicts with the third draft based on a comparison between the current data structure and the second data structure; and based on the determining, presenting, by the client device, a second user interface that prompts the user to resolve the conflict.

13. The non-transitory computer readable medium of claim 12, wherein presenting, by the client device, the second user interface that prompts the user to resolve the conflict comprises:

prompting the user to choose between the current draft of the content item and the third draft of the content item.

14. The non-transitory computer readable medium of claim 13, further comprising:

determining, by the client device, that the user chose the current draft; and sending, by the client device to the content management system, the current draft and the current data structure.

15. A system, comprising:

one or more processors; and a memory having programming instructions stored thereon, which, when executed by the one or more processors, performs one or more operations comprising:

presenting a first user interface that enables a user to compose a draft of a content item;

receiving, via the first user interface, a first draft of the content item;

storing the first draft of the content item and first data structure corresponding to the content item, wherein the first data structure includes first version information, and wherein the first data structure is maintained and updated at the system;

sending the first draft and the first data structure to a content management system;

detecting an update to the first draft of the content item;

based on the detecting, updating the first data structure to indicate a new version of the content item;

receiving, from the content management system, a second draft of the content item and a second data structure corresponding to the second draft of the content item, wherein the second data structure includes second version information associated with the second draft of the content item, wherein the second data structure is maintained and updated at the content management system;

comparing the second data structure to the updated first data structure to determine whether the second draft was updated based on a different version of the first draft;

determining that the updated first draft conflicts with the second draft based on a comparison between the updated first data structure and the second data structure; and based on the determining, presenting a second user interface that prompts the user to resolve the conflict.

16. The system of claim 15, wherein the first data structure and the second data structure comprise version information indicating a version associated with a draft of the content item and wherein the version of the draft of the content item corresponds to a value, the value being adjusted based on composing the draft of the content item.

17. The system of claim 15, wherein storing the first draft of the content item and the first data structure corresponding to the content item comprises:

updating the first version information indicating a version corresponding to the first draft of the content item.

18. The system of claim 15, wherein comparing the second data structure to the updated first data structure comprises:

comparing version information corresponding to the second data structure to version information corresponding to the updated first data structure.

19. A system comprising:

one or more processors; and a memory having programming instructions stored thereon, which, when executed by the one or more processors, performs one or more operations comprising:

receiving, from a first device, a first data structure stored and maintained by the first device and a first draft of a message composed using the first device, wherein the first data structure includes first version information indicating a first draft version stored by the first device;

storing the first draft of the message as a current version of the message, wherein the current version is stored as a current draft of the message for a plurality of devices including the first device and a second device;

generating a central data structure based on the first data structure, wherein the central data structure is maintained by the system and includes the first version information and current version information indicated by the current version associated with the current draft;

synchronizing the current version of the message by sending, to the first device and the second device, the current version information and the current draft;

receiving, from the second device, a second data structure stored and maintained by the second device and a second draft of the message, the second data structure includes second version information indicating a second draft version stored by the second device and the current draft version, the second draft composed by modifying the current draft using the second device;

comparing the current data structure to the second data structure to determine whether to update the current draft based on the second draft, wherein comparing the current data structure to the second data structure includes determining whether the current draft is different from the second draft and determining whether the current version information in the current data structure matches the current version information in the second data structure; and upon determining to update the current draft based on the second draft:

updating the current data structure to reflect the second version information by incrementing the current version information; and updating the stored current draft based on the second draft.

\* \* \* \* \*